United States Patent
Wilson et al.

(10) Patent No.: US 12,415,408 B2
(45) Date of Patent: *Sep. 16, 2025

(54) PROTECTIVE BARRIER FOR SAFETY GLAZING

(71) Applicant: RO Technologies, LLC, Las Vegas, NV (US)

(72) Inventors: Bart E. Wilson, Las Vegas, NV (US); Stephen S. Wilson, Las Vegas, NV (US); Seth Wilson, Las Vegas, NV (US)

(73) Assignee: RO TECHNOLOGIES, LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/169,590

(22) Filed: Apr. 3, 2025

(65) Prior Publication Data

US 2025/0230936 A1    Jul. 17, 2025

Related U.S. Application Data

(63) Continuation of application No. 18/786,149, filed on Jul. 26, 2024, now Pat. No. 12,292,205, which is a (Continued)

(51) Int. Cl.
*B32B 7/12* (2006.01)
*B32B 27/08* (2006.01)
(Continued)

(52) U.S. Cl.
CPC .............. *F24F 1/0093* (2019.02); *B32B 7/12* (2013.01); *B32B 27/08* (2013.01); *B32B 27/36* (2013.01);
(Continued)

(58) Field of Classification Search
CPC ........... B32B 7/12; B32B 27/08; B32B 27/36; B32B 37/182; B60J 1/2094
See application file for complete search history.

(56) References Cited

U.S. PATENT DOCUMENTS

| 17,744 A | 7/1857 | Lathbury |
| 192,075 A | 6/1877 | Lumbaed |

(Continued)

FOREIGN PATENT DOCUMENTS

| CA | 2952436 A1 | 12/2015 |
| CA | 2952436 C | 3/2021 |

(Continued)

OTHER PUBLICATIONS

International Search Report; International Application No. PCT/US99/95128; Date of Completion: Jan. 18, 2000; 54 pages.

(Continued)

*Primary Examiner* — Elizabeth E Mulvaney
(74) *Attorney, Agent, or Firm* — Stetina Garred Brucker & Newboles

(57) ABSTRACT

A protective barrier affixable to a curved substrate comprises a stack of two or more lenses, each of the two or more lenses including a polyethylene terephthalate (PET) film, a hard coat on a first side of the PET film, and an adhesive layer on a second side of the PET film opposite the first side. The stack of two or more lenses may have a modulation transfer function that exhibits a contrast value greater than 75% for a spatial resolution of one line-pair per 0.0003 radians at 65 degrees angle of incidence. Heat and pressure may be applied to conform the stack of two or more lenses to the shape of the curved substrate.

20 Claims, 5 Drawing Sheets

Related U.S. Application Data continuation of application No. 18/478,220, filed on Sep. 29, 2023, now Pat. No. 12,077,037, which is a continuation of application No. 18/062,901, filed on Dec. 7, 2022, now Pat. No. 11,807,078, which is a continuation of application No. 16/866,392, filed on May 4, 2020, now Pat. No. 11,548,356.

(60) Provisional application No. 62/987,726, filed on Mar. 10, 2020.

(51) Int. Cl.
    *B32B 27/36* (2006.01)
    *B32B 37/18* (2006.01)
    *B60J 1/02* (2006.01)
    *F24F 1/0093* (2019.01)
    *F24F 11/30* (2018.01)
    *F24F 11/52* (2018.01)
    *F24F 11/86* (2018.01)
    *G02B 1/14* (2015.01)
    *F24F 110/12* (2018.01)

(52) U.S. Cl.
    CPC ............ *B32B 37/182* (2013.01); *B60J 1/02* (2013.01); *F24F 11/30* (2018.01); *F24F 11/52* (2018.01); *F24F 11/86* (2018.01); *G02B 1/14* (2015.01); *B32B 2605/006* (2013.01); *F24F 2110/12* (2018.01)

(56) References Cited

U.S. PATENT DOCUMENTS

| | | |
|---|---|---|
| 671,258 A | 4/1901 | Armstrong |
| 694,969 A | 3/1902 | Kemp |
| 781,507 A | 1/1905 | Evans |
| 781,508 A | 1/1905 | Fernow |
| 805,256 A | 11/1905 | Branch |
| 815,190 A | 3/1906 | Marchessault |
| 849,240 A | 4/1907 | Holman |
| 850,256 A | 4/1907 | Runge |
| 879,384 A | 2/1908 | Hillman |
| 882,182 A | 3/1908 | Thompson |
| 907,299 A | 12/1908 | Stroeh |
| 907,300 A | 12/1908 | Sturtevant et al. |
| 925,129 A | 6/1909 | Nicholson |
| 925,834 A | 6/1909 | Corbo et al. |
| 1,047,537 A | 12/1912 | Kiewicz |
| 1,337,036 A | 4/1920 | Bergmann |
| 1,366,907 A | 2/1921 | Dunand |
| 1,471,415 A | 10/1923 | Platt |
| 1,517,791 A | 12/1924 | Mcandrew |
| 2,138,086 A | 11/1938 | Blodjer |
| 2,248,331 A | 7/1941 | Blodjer |
| 2,310,862 A | 2/1943 | Friedrich |
| 2,328,687 A | 9/1943 | Serr |
| 2,339,280 A | 1/1944 | Madson |
| 2,354,415 A | 7/1944 | Woodard |
| 2,386,043 A | 10/1945 | Everett |
| 2,461,604 A | 2/1949 | Huntsman |
| 2,492,574 A | 12/1949 | Heintzelman |
| 2,511,329 A | 6/1950 | Craig |
| 2,546,117 A | 3/1951 | Whelan |
| 2,563,125 A | 8/1951 | Malcolm, Jr. |
| 2,569,715 A | 10/1951 | Green |
| 2,640,068 A | 5/1953 | Schaefer et al. |
| 2,736,109 A | 2/1956 | Scholl |
| 2,923,944 A | 2/1960 | Lindblom |
| 2,963,708 A | 12/1960 | Herbine et al. |
| 3,052,678 A | 9/1962 | Ziegler |
| 3,095,575 A | 7/1963 | Radov |
| 3,138,155 A | 6/1964 | Bould |
| 3,157,480 A | 11/1964 | Beukeri |
| 3,298,031 A | 1/1967 | Morgan |
| 3,475,766 A | 11/1969 | Raschke |
| 3,577,565 A | 5/1971 | Feldmann et al. |
| 3,605,115 A | 9/1971 | Bohner |
| 3,637,188 A | 1/1972 | Ung |
| 3,685,054 A | 8/1972 | Raschke |
| 3,774,239 A | 11/1973 | Kotzar |
| 3,785,102 A | 1/1974 | Amos |
| 3,797,042 A | 3/1974 | Gager |
| 3,810,815 A | 5/1974 | Welhart et al. |
| 3,868,293 A | 2/1975 | Selph |
| 3,937,863 A | 2/1976 | Moore |
| 3,948,662 A | 4/1976 | Alston, Jr. et al. |
| 3,950,580 A | 4/1976 | Boudet |
| 3,987,569 A | 10/1976 | Chase |
| 4,063,740 A | 12/1977 | Mader |
| 4,076,373 A | 2/1978 | Moretti |
| 4,090,464 A | 5/1978 | Bishopp et al. |
| D249,597 S | 9/1978 | Dillon |
| 4,138,746 A | 2/1979 | Bergmann |
| D254,638 S | 4/1980 | Bay, Jr. |
| 4,204,231 A | 5/1980 | Permenter |
| 4,248,762 A | 2/1981 | Hornibrook et al. |
| 4,248,918 A | 2/1981 | Hornibrook et al. |
| 4,268,134 A | 5/1981 | Gulati et al. |
| 4,273,098 A | 6/1981 | Silverstein |
| 4,301,193 A | 11/1981 | Zuk |
| 4,314,537 A | 2/1982 | Asano et al. |
| 4,332,861 A | 6/1982 | Franz et al. |
| 4,333,983 A | 6/1982 | Allen |
| 4,380,563 A | 4/1983 | Ayotte |
| 4,528,701 A | 7/1985 | Smith |
| 4,557,980 A | 12/1985 | Hodnett, III |
| 4,582,764 A | 4/1986 | Allerd et al. |
| 4,625,341 A | 12/1986 | Broersma |
| 4,658,515 A | 4/1987 | Oatman |
| 4,696,860 A | 9/1987 | Epperson |
| 4,701,965 A | 10/1987 | Landis |
| 4,716,601 A | 1/1988 | Mcneal |
| 4,726,074 A | 2/1988 | Baclit et al. |
| 4,729,179 A | 3/1988 | Quist, Jr. |
| 4,769,265 A | 9/1988 | Coburn, Jr. |
| D299,767 S | 2/1989 | Hsin |
| 4,842,919 A | 6/1989 | David et al. |
| 4,850,049 A | 7/1989 | Landis et al. |
| 4,852,185 A | 8/1989 | Olson |
| 4,852,186 A | 8/1989 | Landis |
| 4,853,974 A | 8/1989 | Olim |
| 4,856,535 A | 8/1989 | Forbes |
| 4,864,653 A | 9/1989 | Landis |
| 4,867,178 A | 9/1989 | Smith |
| 4,884,296 A | 12/1989 | Nix, Jr. |
| 4,884,302 A | 12/1989 | Foehl |
| 4,889,754 A | 12/1989 | Vargas |
| D306,363 S | 2/1990 | Stackhouse et al. |
| 4,907,090 A | 3/1990 | Ananian |
| 4,911,964 A | 3/1990 | Corbo et al. |
| D307,065 S | 4/1990 | Friedman |
| 4,920,576 A | 5/1990 | Landis |
| 4,934,792 A | 6/1990 | Tovi |
| 4,945,573 A | 8/1990 | Landis |
| 4,950,445 A | 8/1990 | Salce et al. |
| D311,263 S | 10/1990 | Russell |
| 4,964,171 A | 10/1990 | Landis |
| 4,965,887 A | 10/1990 | Paoluccio et al. |
| 4,973,511 A | 11/1990 | Farmer et al. |
| 4,975,981 A | 12/1990 | Ray |
| 5,000,528 A | 3/1991 | Kawakatsu |
| 5,002,326 A | 3/1991 | Westfield et al. |
| D318,147 S | 7/1991 | Russell |
| 5,035,004 A | 7/1991 | Koester |
| D319,449 S | 8/1991 | Millar |
| 5,046,195 A | 9/1991 | Koritan |
| D321,268 S | 10/1991 | Nix, Jr. |
| 5,052,054 A | 10/1991 | Birum |
| 5,054,480 A | 10/1991 | Bare et al. |
| 5,067,475 A | 11/1991 | Posnansky |
| 5,071,206 A | 12/1991 | Hood et al. |
| H1023 H | 3/1992 | Wiseman |
| 5,104,929 A | 4/1992 | Bilkadi |

(56) References Cited

U.S. PATENT DOCUMENTS

| | | |
|---|---|---|
| 5,113,528 A | 5/1992 | Burke, Jr. et al. |
| 5,162,046 A | 11/1992 | Mercado |
| D331,820 S | 12/1992 | Scanlon |
| D333,366 S | 2/1993 | Brown |
| 5,183,700 A | 2/1993 | Austin |
| 5,194,293 A | 3/1993 | Foster |
| 5,201,077 A | 4/1993 | Dondlinger |
| 5,206,956 A | 5/1993 | Olson |
| 5,208,916 A | 5/1993 | Kelman |
| 5,239,406 A | 8/1993 | Lynam |
| 5,318,685 A | 6/1994 | O'Shaughnessy |
| D349,177 S | 7/1994 | Russell |
| D349,178 S | 7/1994 | Russell |
| 5,327,180 A | 7/1994 | Hester, III et al. |
| D349,362 S | 8/1994 | Russell |
| 5,364,671 A | 11/1994 | Gustafson |
| 5,365,615 A | 11/1994 | Piszkin |
| D353,691 S | 12/1994 | Scanlon |
| D354,588 S | 1/1995 | Russell |
| D354,589 S | 1/1995 | Russell |
| 5,420,649 A | 5/1995 | Lewis |
| D359,586 S | 6/1995 | Lofton |
| D361,160 S | 8/1995 | Russell |
| 5,443,877 A | 8/1995 | Kramer et al. |
| D362,086 S | 9/1995 | Russell |
| 5,468,247 A | 11/1995 | Matthai et al. |
| 5,471,036 A | 11/1995 | Sperbeck |
| 5,473,778 A | 12/1995 | Bell |
| 5,486,883 A | 1/1996 | Candido |
| 5,507,332 A | 4/1996 | Mckinnon |
| 5,510,173 A | 4/1996 | Pass et al. |
| 5,512,116 A | 4/1996 | Campfield |
| 5,523,132 A | 6/1996 | Zhang et al. |
| RE35,318 E | 8/1996 | Warman |
| 5,544,361 A | 8/1996 | Fine et al. |
| 5,553,608 A | 9/1996 | Reese et al. |
| 5,555,570 A | 9/1996 | Bay, Jr. |
| 5,557,683 A | 9/1996 | Eubanks |
| 5,584,130 A | 12/1996 | Perron |
| 5,592,698 A | 1/1997 | Woods |
| 5,593,786 A | 1/1997 | Parker et al. |
| 5,622,580 A | 4/1997 | Mannheim |
| 5,633,049 A | 5/1997 | Bilkadi et al. |
| 5,668,612 A | 9/1997 | Hung |
| 5,671,483 A | 9/1997 | Reuber |
| 5,673,431 A | 10/1997 | Batty |
| 5,687,420 A | 11/1997 | Chong |
| 5,694,650 A | 12/1997 | Hong |
| 5,702,415 A | 12/1997 | Matthai et al. |
| 5,709,825 A | 1/1998 | Shih |
| 5,740,560 A | 4/1998 | Muoio |
| 5,792,535 A | 8/1998 | Weder |
| 5,806,102 A | 9/1998 | Park |
| 5,815,848 A | 10/1998 | Jarvis |
| 5,819,311 A | 10/1998 | Lo |
| 5,846,659 A | 12/1998 | Loewer et al. |
| D404,849 S | 1/1999 | Desy |
| 5,885,704 A | 3/1999 | Peiffer et al. |
| 5,896,991 A | 4/1999 | Hippely et al. |
| 5,924,129 A | 7/1999 | Gill |
| 5,937,596 A | 8/1999 | Leeuwenburgh et al. |
| 5,956,175 A | 9/1999 | Hojnowski |
| 5,972,453 A | 10/1999 | Akiwa et al. |
| 5,991,072 A | 11/1999 | Solyntjes et al. |
| 5,991,081 A | 11/1999 | Haaland et al. |
| 5,991,930 A | 11/1999 | Sorrentino |
| D418,256 S | 12/1999 | Caruana |
| 6,008,299 A | 12/1999 | Mcgrath et al. |
| 6,049,419 A | 4/2000 | Wheatley et al. |
| 6,085,358 A | 7/2000 | Cogan |
| 6,117,860 A | 9/2000 | Jennings-White et al. |
| 6,143,496 A | 11/2000 | Brown et al. |
| 6,173,447 B1 | 1/2001 | Arnold |
| 6,217,099 B1 | 4/2001 | Mckinney et al. |
| 6,221,112 B1 | 4/2001 | Snider |
| 6,237,147 B1 | 5/2001 | Brockman |
| 6,250,765 B1 | 6/2001 | Murakami |
| 6,305,073 B1 | 10/2001 | Badders |
| 6,347,401 B1 | 2/2002 | Joyce |
| 6,375,865 B1 | 4/2002 | Paulson et al. |
| 6,378,133 B1 | 4/2002 | Daikuzono |
| 6,381,750 B1 | 5/2002 | Mangan |
| 6,385,776 B2 | 5/2002 | Linday |
| 6,388,813 B1 | 5/2002 | Wilson et al. |
| 6,403,005 B1 | 6/2002 | Mientus et al. |
| 6,416,872 B1 | 7/2002 | Maschwitz |
| 6,432,522 B1 | 8/2002 | Friedman et al. |
| 6,461,709 B1 | 10/2002 | Janssen et al. |
| 6,469,752 B1 | 10/2002 | Ishikawa et al. |
| 6,481,019 B2 | 11/2002 | Diaz et al. |
| 6,491,390 B1 | 12/2002 | Provost |
| 6,531,180 B1 | 3/2003 | Takushima et al. |
| 6,536,045 B1 | 3/2003 | Wilson et al. |
| 6,536,589 B2 | 3/2003 | Chang |
| 6,555,235 B1 | 4/2003 | Aufderheide et al. |
| 6,559,902 B1 | 5/2003 | Kusuda et al. |
| 6,576,349 B2 | 6/2003 | Lingle et al. |
| 6,584,614 B2 | 7/2003 | Hogg |
| 6,592,950 B1 | 7/2003 | Toshima et al. |
| 6,614,423 B1 | 9/2003 | Wong et al. |
| 6,622,311 B2 | 9/2003 | Diaz et al. |
| D480,838 S | 10/2003 | Martin |
| 6,654,071 B2 | 11/2003 | Chen |
| 6,660,389 B2 | 12/2003 | Liu et al. |
| 6,662,371 B2 | 12/2003 | Shin |
| 6,667,738 B2 | 12/2003 | Murphy |
| 6,739,718 B1 | 5/2004 | Jung |
| 6,745,396 B1 | 6/2004 | Landis et al. |
| 6,750,922 B1 | 6/2004 | Benning |
| 6,767,596 B2 | 7/2004 | Hayakawa et al. |
| 6,773,778 B2 | 8/2004 | Onozawa et al. |
| 6,773,816 B2 | 8/2004 | Tsutsumi |
| 6,777,055 B2 | 8/2004 | Janssen et al. |
| 6,800,378 B2 | 10/2004 | Hawa et al. |
| 6,838,610 B2 | 1/2005 | De Moraes |
| 6,841,190 B2 | 1/2005 | Liu et al. |
| 6,847,492 B2 | 1/2005 | Wilson et al. |
| 6,864,882 B2 | 3/2005 | Newton |
| 6,870,686 B2 | 3/2005 | Wilson et al. |
| 6,879,319 B2 | 4/2005 | Cok |
| 6,907,617 B2 | 6/2005 | Johnson |
| 6,911,593 B2 | 6/2005 | Mazumder et al. |
| 6,922,850 B1 | 8/2005 | Arnold |
| 6,952,950 B2 | 10/2005 | Doe et al. |
| 6,967,044 B1 | 11/2005 | O'Brien |
| D512,797 S | 12/2005 | Canavan et al. |
| 6,973,677 B2 | 12/2005 | Diaz et al. |
| 6,995,976 B2 | 2/2006 | Richardson |
| 7,021,456 B2 | 4/2006 | Haan et al. |
| 7,070,837 B2 | 7/2006 | Ross |
| 7,071,927 B2 | 7/2006 | Blanchard |
| D526,446 S | 8/2006 | Cowan et al. |
| 7,097,080 B2 | 8/2006 | Cox |
| 7,101,810 B2 | 9/2006 | Bond et al. |
| 7,103,920 B1 | 9/2006 | Otterson |
| 7,143,979 B2 | 12/2006 | Wood et al. |
| 7,184,217 B2 | 2/2007 | Wilson et al. |
| D541,991 S | 5/2007 | Lawrence |
| 7,215,473 B2 | 5/2007 | Fleming |
| 7,226,176 B1 | 6/2007 | Huang |
| 7,238,401 B1 | 7/2007 | Dietz |
| 7,311,956 B2 | 12/2007 | Pitzen |
| D559,442 S | 1/2008 | Regelbrugge et al. |
| 7,344,241 B2 | 3/2008 | Baek |
| 7,351,470 B2 | 4/2008 | Draheim et al. |
| D569,557 S | 5/2008 | Cho |
| 7,389,869 B2 | 6/2008 | Mason, Jr. |
| 7,410,684 B2 | 8/2008 | Mccormick |
| 7,425,369 B2 | 9/2008 | Oakey et al. |
| D586,052 S | 2/2009 | Elias |
| 7,495,895 B2 | 2/2009 | Carnevali |
| 7,597,441 B1 | 10/2009 | Farwig |
| 7,629,052 B2 | 12/2009 | Brumwell |
| 7,631,365 B1 | 12/2009 | Mahan |

(56) References Cited

U.S. PATENT DOCUMENTS

| | | |
|---|---|---|
| 7,663,047 B2 | 2/2010 | Hanuschak |
| 7,709,095 B2 | 5/2010 | Persoone et al. |
| 7,722,921 B2 | 5/2010 | Shimoda et al. |
| 7,727,615 B2 | 6/2010 | Kato et al. |
| 7,735,156 B2 | 6/2010 | Vanderwoude et al. |
| 7,752,682 B2 | 7/2010 | Vanderwoude et al. |
| 7,812,077 B2 | 10/2010 | Borade et al. |
| 7,858,001 B2 | 12/2010 | Qin et al. |
| 7,937,775 B2 | 5/2011 | Manzella, Jr. et al. |
| 7,957,524 B2 | 6/2011 | Chipping |
| 8,024,818 B1 | 9/2011 | Davenport |
| 8,044,942 B1 | 10/2011 | Leonhard et al. |
| 8,101,277 B2 | 1/2012 | Logan et al. |
| 8,121,619 B1 | 2/2012 | Ghosh et al. |
| 8,234,722 B2 | 8/2012 | Vanderwoude et al. |
| 8,261,375 B1 | 9/2012 | Reaux |
| 8,282,234 B2 | 10/2012 | Vanderwoude et al. |
| 8,292,347 B1 | 10/2012 | Drake et al. |
| 8,294,843 B2 | 10/2012 | Hollaway |
| 8,316,470 B2 | 11/2012 | Mcneal et al. |
| 8,361,260 B2 | 1/2013 | Wilson et al. |
| 8,407,818 B2 | 4/2013 | Vanderwoude et al. |
| D683,077 S | 5/2013 | Klotz et al. |
| 8,455,105 B2 | 6/2013 | Hobeika et al. |
| D692,187 S | 10/2013 | Isobe |
| D692,189 S | 10/2013 | Isobe |
| 8,567,596 B1 | 10/2013 | Mason, Jr. |
| 8,693,102 B2 | 4/2014 | Wilson et al. |
| 8,819,869 B2 | 9/2014 | Vanderwoude et al. |
| 8,889,801 B2 | 11/2014 | Liao et al. |
| 8,918,198 B2 | 12/2014 | Atanasoff |
| 8,974,620 B2 | 3/2015 | Wilson et al. |
| D726,378 S | 4/2015 | Wako |
| 8,999,509 B2 | 4/2015 | Port et al. |
| 9,023,162 B2 | 5/2015 | Mccormick et al. |
| 9,104,256 B2 | 8/2015 | Wilson et al. |
| 9,128,545 B2 | 9/2015 | Wilson et al. |
| 9,150,763 B2 | 10/2015 | Lopez et al. |
| 9,161,858 B2 | 10/2015 | Capers et al. |
| 9,170,415 B2 | 10/2015 | Mansuy |
| 9,173,437 B2 | 11/2015 | Vanderwoude et al. |
| 9,204,823 B2 | 12/2015 | Derenne et al. |
| 9,274,625 B2 | 3/2016 | Wilson et al. |
| 9,295,297 B2 | 3/2016 | Wilson |
| D759,900 S | 6/2016 | Cummings et al. |
| 9,442,306 B1 | 9/2016 | Hines et al. |
| 9,471,163 B2 | 10/2016 | Wilson et al. |
| 9,526,290 B2 | 12/2016 | Wilson |
| 9,575,231 B2 | 2/2017 | Chu et al. |
| 9,629,407 B2 | 4/2017 | Foster |
| 9,671,622 B1 | 6/2017 | Vetrini et al. |
| 9,706,808 B2 | 7/2017 | Sclafani et al. |
| 9,726,940 B2 | 8/2017 | Tomiyasu |
| 9,905,297 B2 | 2/2018 | Best |
| 9,968,155 B2 | 5/2018 | Wilson |
| 10,070,678 B2 | 9/2018 | Wilson |
| 10,165,819 B2 | 1/2019 | Klotz et al. |
| 10,167,765 B2 | 1/2019 | Kilbreath et al. |
| 10,201,207 B2 | 2/2019 | Vanderwoude et al. |
| 10,226,095 B2 | 3/2019 | Wilson |
| 10,227,501 B2 | 3/2019 | Hwang et al. |
| 10,321,731 B2 | 6/2019 | Wilson |
| 10,345,934 B2 | 7/2019 | Wilson et al. |
| 10,384,084 B2 | 8/2019 | Isham et al. |
| 10,427,385 B2 | 10/2019 | Wilson et al. |
| 10,449,397 B2 | 10/2019 | Vanderwoude et al. |
| 10,520,756 B2 | 12/2019 | Gallina et al. |
| 10,537,236 B2 | 1/2020 | Bennett et al. |
| 10,620,670 B2 | 4/2020 | Wilson et al. |
| 10,687,569 B1 | 6/2020 | Mcdirmid |
| 10,716,986 B2 | 7/2020 | Winter et al. |
| 10,871,661 B2 | 12/2020 | Saylor et al. |
| 10,874,163 B2 | 12/2020 | Vanderwoude et al. |
| 11,090,516 B2 | 8/2021 | Vanderwoude et al. |
| 11,141,959 B2 | 10/2021 | Wilson et al. |
| 11,147,323 B1 | 10/2021 | Wilson |
| 11,307,329 B1 | 4/2022 | Wilson et al. |
| 11,480,801 B1 | 10/2022 | Morris et al. |
| 11,490,667 B1 | 11/2022 | Wilson et al. |
| 11,510,718 B2 | 11/2022 | Childers et al. |
| 11,548,356 B2 * | 1/2023 | Wilson .................. B32B 27/08 |
| 11,579,339 B2 | 2/2023 | Thothadri et al. |
| 11,699,030 B1 | 7/2023 | Burd et al. |
| 11,709,296 B2 | 7/2023 | Wilson et al. |
| 11,723,420 B2 | 8/2023 | Wilson et al. |
| 11,807,078 B2 * | 11/2023 | Wilson ..................... B32B 7/12 |
| 11,912,001 B2 | 2/2024 | Wilson et al. |
| 11,988,850 B2 | 5/2024 | Wilson et al. |
| 12,077,037 B2 * | 9/2024 | Wilson ..................... G02B 1/14 |
| 12,162,330 B2 | 12/2024 | Wilson et al. |
| 2001/0035936 A1 | 11/2001 | Maisnik |
| 2002/0025441 A1 | 2/2002 | Hieda et al. |
| 2002/0036362 A1 | 3/2002 | Chigira et al. |
| 2002/0101411 A1 | 8/2002 | Chang |
| 2002/0109922 A1 | 8/2002 | Wilson et al. |
| 2002/0114934 A1 | 8/2002 | Liu et al. |
| 2002/0122925 A1 | 9/2002 | Liu et al. |
| 2002/0159159 A1 | 10/2002 | Wilson et al. |
| 2002/0195910 A1 | 12/2002 | Hus et al. |
| 2003/0012936 A1 | 1/2003 | Draheim et al. |
| 2003/0087054 A1 | 5/2003 | Janssen et al. |
| 2003/0110613 A1 | 6/2003 | Ross |
| 2004/0004605 A1 | 1/2004 | David |
| 2004/0109096 A1 | 6/2004 | Anderson et al. |
| 2004/0121105 A1 | 6/2004 | Janssen et al. |
| 2004/0139530 A1 | 7/2004 | Yan |
| 2004/0202812 A1 | 10/2004 | Congard et al. |
| 2004/0227722 A1 | 11/2004 | Friberg et al. |
| 2004/0238690 A1 | 12/2004 | Wood et al. |
| 2004/0246386 A1 | 12/2004 | Thomas et al. |
| 2004/0258933 A1 | 12/2004 | Enniss et al. |
| 2005/0002108 A1 | 1/2005 | Wilson et al. |
| 2005/0015860 A1 | 1/2005 | Reaux |
| 2005/0071909 A1 | 4/2005 | Diaz et al. |
| 2005/0133035 A1 | 6/2005 | Yahiaoui et al. |
| 2005/0180877 A1 | 8/2005 | Usami et al. |
| 2005/0186415 A1 | 8/2005 | Mccormick et al. |
| 2005/0188821 A1 | 9/2005 | Yamashita et al. |
| 2005/0200154 A1 | 9/2005 | Barbee et al. |
| 2005/0244595 A1 | 11/2005 | Hagen et al. |
| 2005/0249957 A1 | 11/2005 | Jing et al. |
| 2005/0260343 A1 | 11/2005 | Han |
| 2006/0024494 A1 | 2/2006 | Amano et al. |
| 2006/0052167 A1 | 3/2006 | Boddicker et al. |
| 2006/0056030 A1 | 3/2006 | Fukuda et al. |
| 2006/0057399 A1 | 3/2006 | Persoone et al. |
| 2006/0114245 A1 | 6/2006 | Masters et al. |
| 2006/0138694 A1 | 6/2006 | Biernath et al. |
| 2006/0158609 A1 | 7/2006 | Heil |
| 2006/0177654 A1 | 8/2006 | Shoshi |
| 2006/0204776 A1 | 9/2006 | Chen et al. |
| 2006/0254088 A1 | 11/2006 | Mccormick |
| 2006/0285218 A1 | 12/2006 | Wilson et al. |
| 2007/0000793 A1 | 1/2007 | Nelson |
| 2007/0019300 A1 | 1/2007 | Wilson et al. |
| 2007/0181456 A1 | 8/2007 | Kusuda et al. |
| 2007/0211002 A1 | 9/2007 | Zehner et al. |
| 2007/0212508 A1 | 9/2007 | Mase |
| 2007/0229962 A1 | 10/2007 | Mason |
| 2007/0234592 A1 | 10/2007 | Crates |
| 2007/0234888 A1 | 10/2007 | Rotolo De Moraes |
| 2007/0286995 A1 | 12/2007 | Li et al. |
| 2008/0014446 A1 | 1/2008 | Donea et al. |
| 2008/0030631 A1 | 2/2008 | Gallagher |
| 2008/0030675 A1 | 2/2008 | Dillon |
| 2008/0055258 A1 | 3/2008 | Sauers |
| 2008/0118678 A1 | 5/2008 | Huang et al. |
| 2008/0151177 A1 | 6/2008 | Wang |
| 2008/0160321 A1 | 7/2008 | Padiyath et al. |
| 2008/0176018 A1 | 7/2008 | Enniss et al. |
| 2008/0192351 A1 | 8/2008 | Miyagawa et al. |
| 2008/0231979 A1 | 9/2008 | Chen |
| 2008/0256688 A1 | 10/2008 | Bruce |
| 2008/0286500 A1 | 11/2008 | Sussner et al. |

(56) References Cited

U.S. PATENT DOCUMENTS

| | | |
|---|---|---|
| 2008/0292820 A1 | 11/2008 | Padiyath et al. |
| 2009/0008857 A1 | 1/2009 | Robinson et al. |
| 2009/0011205 A1 | 1/2009 | Thiel |
| 2009/0026095 A1 | 1/2009 | Lofland et al. |
| 2009/0054115 A1 | 2/2009 | Horrdin et al. |
| 2009/0086415 A1 | 4/2009 | Chipping |
| 2009/0087655 A1 | 4/2009 | Yamada et al. |
| 2009/0105437 A1 | 4/2009 | Determan et al. |
| 2009/0119819 A1 | 5/2009 | Thompson |
| 2009/0181242 A1 | 7/2009 | Enniss et al. |
| 2009/0233032 A1 | 9/2009 | Craig |
| 2009/0239045 A1 | 9/2009 | Kato et al. |
| 2009/0239048 A1 | 9/2009 | Sugihara et al. |
| 2010/0026646 A1 | 2/2010 | Xiao et al. |
| 2010/0027992 A1 | 2/2010 | Harada et al. |
| 2010/0033442 A1 | 2/2010 | Kusuda et al. |
| 2010/0102197 A1 | 4/2010 | Mcintyre |
| 2010/0102476 A1 | 4/2010 | Higgins |
| 2010/0122402 A1 | 5/2010 | Tipp |
| 2010/0146679 A1 | 6/2010 | Heil |
| 2010/0238119 A1 | 9/2010 | Dubrovsky et al. |
| 2010/0245273 A1 | 9/2010 | Hwang et al. |
| 2010/0270189 A1 | 10/2010 | Pedersen, II et al. |
| 2011/0007388 A1 | 1/2011 | Wilson et al. |
| 2011/0010994 A1 | 1/2011 | Wilson et al. |
| 2011/0012841 A1 | 1/2011 | Lin |
| 2011/0013273 A1 | 1/2011 | Wilson et al. |
| 2011/0014481 A1 | 1/2011 | Wilson et al. |
| 2011/0035936 A1 | 2/2011 | Lee |
| 2011/0052864 A1 | 3/2011 | Son |
| 2011/0097574 A1 | 4/2011 | Faldysta et al. |
| 2011/0119801 A1 | 5/2011 | Wright |
| 2011/0165361 A1 | 7/2011 | Sherman et al. |
| 2011/0168261 A1 | 7/2011 | Welser et al. |
| 2011/0267793 A1 | 11/2011 | Cohen et al. |
| 2011/0271497 A1 | 11/2011 | Suh et al. |
| 2011/0277361 A1 | 11/2011 | Nichol et al. |
| 2011/0279383 A1 | 11/2011 | Wilson et al. |
| 2012/0001292 A1 | 1/2012 | Sasaki |
| 2012/0003431 A1 | 1/2012 | Huang |
| 2012/0030095 A1 | 2/2012 | Marshall et al. |
| 2012/0047614 A1 | 3/2012 | Choi |
| 2012/0070603 A1 | 3/2012 | Hsu |
| 2012/0081792 A1 | 4/2012 | Neuffer |
| 2012/0137414 A1 | 6/2012 | Saylor |
| 2012/0149561 A1 | 6/2012 | Ribi et al. |
| 2012/0180204 A1 | 7/2012 | Hawkins |
| 2012/0183712 A1 | 7/2012 | Leonhard et al. |
| 2012/0183822 A1 | 7/2012 | Chung et al. |
| 2012/0188743 A1 | 7/2012 | Wilson et al. |
| 2012/0200816 A1 | 8/2012 | Krasnov et al. |
| 2012/0291173 A1 | 11/2012 | Gleason et al. |
| 2013/0045371 A1 | 2/2013 | O'Donnell |
| 2013/0083285 A1 | 4/2013 | Mcneal et al. |
| 2013/0089688 A1 | 4/2013 | Wilson et al. |
| 2013/0098543 A1 | 4/2013 | Reuter et al. |
| 2013/0141693 A1 | 6/2013 | Mccabe et al. |
| 2013/0145525 A1 | 6/2013 | Arenson et al. |
| 2013/0222913 A1 | 8/2013 | Tomoda et al. |
| 2013/0247286 A1 | 9/2013 | Vanderwoude et al. |
| 2013/0293959 A1 | 11/2013 | Mcdonald |
| 2014/0020153 A1 | 1/2014 | Romanski et al. |
| 2014/0032222 A1 | 1/2014 | Vetter et al. |
| 2014/0050909 A1 | 2/2014 | Choi et al. |
| 2014/0220283 A1 | 8/2014 | Wilson et al. |
| 2014/0259321 A1 | 9/2014 | Arnold |
| 2014/0289937 A1 | 10/2014 | Capers et al. |
| 2015/0009114 A1 | 1/2015 | Chen et al. |
| 2015/0033431 A1 | 2/2015 | Hofer Kraner et al. |
| 2015/0091425 A1 | 4/2015 | Rheault et al. |
| 2015/0093413 A1 | 4/2015 | Thess et al. |
| 2015/0103474 A1 | 4/2015 | Cho |
| 2015/0128896 A1 | 5/2015 | Cunningham et al. |
| 2015/0131047 A1 | 5/2015 | Saylor et al. |
| 2015/0195814 A1 | 7/2015 | Li et al. |
| 2015/0202847 A1 | 7/2015 | Johnson et al. |
| 2015/0234209 A1 | 8/2015 | Miyamoto et al. |
| 2015/0258715 A1 | 9/2015 | Ohta |
| 2015/0277196 A1 | 10/2015 | Nishimura et al. |
| 2015/0294656 A1 | 10/2015 | Hanuschak |
| 2015/0309609 A1 | 10/2015 | Wilson et al. |
| 2015/0349147 A1 | 12/2015 | Xi et al. |
| 2015/0359675 A1 | 12/2015 | Wilson |
| 2016/0023442 A1 | 1/2016 | Faris |
| 2016/0050990 A1 | 2/2016 | Hayes |
| 2016/0073720 A1 | 3/2016 | Niedrich |
| 2016/0231834 A1 | 8/2016 | Hardi |
| 2016/0259102 A1 | 9/2016 | Taka |
| 2016/0271922 A1 | 9/2016 | Uzawa et al. |
| 2016/0291543 A1 | 10/2016 | Saito |
| 2016/0318227 A1 | 11/2016 | Kim et al. |
| 2017/0052286 A1 | 2/2017 | Hines et al. |
| 2017/0071792 A1 | 3/2017 | Wilson et al. |
| 2017/0079364 A1 | 3/2017 | Paulson |
| 2017/0129219 A1 | 5/2017 | Uebelacker et al. |
| 2017/0173923 A1 | 6/2017 | Davis et al. |
| 2017/0192131 A1 | 7/2017 | Wilson et al. |
| 2017/0208878 A1 | 7/2017 | Kakinuma et al. |
| 2017/0232713 A1 | 8/2017 | Mannheim Astete et al. |
| 2017/0281414 A1 | 10/2017 | Wilson |
| 2017/0299898 A1 | 10/2017 | Gallina et al. |
| 2017/0318877 A1 | 11/2017 | Yahiaoui et al. |
| 2018/0029337 A1 | 2/2018 | Wilson et al. |
| 2018/0042324 A1 | 2/2018 | King |
| 2018/0052334 A1 | 2/2018 | Repko |
| 2018/0094164 A1 | 4/2018 | Ito et al. |
| 2018/0148578 A1 | 5/2018 | Ohta et al. |
| 2018/0161208 A1 | 6/2018 | Huh |
| 2018/0200329 A1 | 7/2018 | Shi et al. |
| 2018/0229480 A1 | 8/2018 | Chung |
| 2018/0236753 A1 | 8/2018 | Wykoff, II et al. |
| 2018/0295925 A1 | 10/2018 | Gagliardo et al. |
| 2018/0338550 A1 | 11/2018 | Boulware et al. |
| 2019/0006151 A1 | 1/2019 | Paukner et al. |
| 2019/0021430 A1 | 1/2019 | Elliott |
| 2019/0037948 A1 | 2/2019 | Romanski et al. |
| 2019/0055267 A1 | 2/2019 | Liu et al. |
| 2019/0116300 A1 | 4/2019 | Okuno |
| 2019/0118057 A1 | 4/2019 | Winter et al. |
| 2019/0209912 A1 | 7/2019 | Isserow et al. |
| 2019/0212474 A1 | 7/2019 | Le Quang et al. |
| 2019/0346591 A1 | 11/2019 | Thothadri et al. |
| 2019/0389182 A1 | 12/2019 | Wilson et al. |
| 2020/0016245 A1 | 1/2020 | Rumbaugh et al. |
| 2020/0100657 A1 | 4/2020 | Lee et al. |
| 2020/0115519 A1 | 4/2020 | Phillips et al. |
| 2020/0124768 A1 | 4/2020 | Wilson |
| 2020/0134773 A1 | 4/2020 | Pinter et al. |
| 2020/0154808 A1 | 5/2020 | Inouye |
| 2020/0178622 A1 | 6/2020 | Jascomb et al. |
| 2020/0247102 A1 | 8/2020 | Wilson et al. |
| 2020/0261055 A1 | 8/2020 | Zwierstra et al. |
| 2020/0281301 A1 | 9/2020 | Wynalda, Jr. |
| 2020/0310494 A1 | 10/2020 | Ahn et al. |
| 2020/0359718 A1 | 11/2020 | Jefferis et al. |
| 2020/0375272 A1 | 12/2020 | Ulmer et al. |
| 2020/0384747 A1 | 12/2020 | Fukuda et al. |
| 2021/0030095 A1 | 2/2021 | Reicher |
| 2021/0162645 A1 | 6/2021 | Wilson et al. |
| 2021/0176316 A1 | 6/2021 | Donahue et al. |
| 2021/0283994 A1 | 9/2021 | Wilson et al. |
| 2021/0298380 A1 | 9/2021 | Brown, II et al. |
| 2021/0298390 A1 | 9/2021 | Sup, IV et al. |
| 2021/0307425 A1 | 10/2021 | Keim |
| 2021/0315291 A1 | 10/2021 | Votolato et al. |
| 2021/0318553 A1 | 10/2021 | Gharabegian |
| 2021/0321692 A1 | 10/2021 | Wilson |
| 2021/0321693 A1 | 10/2021 | Wilson et al. |
| 2021/0329999 A1 | 10/2021 | Ackerman |
| 2021/0368886 A1 | 12/2021 | Swart et al. |
| 2021/0386155 A1 | 12/2021 | Rose |
| 2021/0393440 A1 | 12/2021 | Leatt et al. |

(56) References Cited

U.S. PATENT DOCUMENTS

| | | | |
|---|---|---|---|
| 2021/0394427 | A1 | 12/2021 | Frisco et al. |
| 2022/0015472 | A1 | 1/2022 | Boza |
| 2023/0106407 | A1 | 4/2023 | Arima et al. |

FOREIGN PATENT DOCUMENTS

| | | | |
|---|---|---|---|
| EP | 45 | A1 | 12/1978 |
| EP | 20501 | A1 | 1/1981 |
| EP | 20501 | A4 | 2/1981 |
| EP | 45 | B1 | 10/1981 |
| JP | 2002328613 | A | 11/2002 |
| TW | 201027992 | A | 7/2010 |
| WO | 2004000540 | A2 | 12/2003 |
| WO | 2015195814 | A1 | 12/2015 |

OTHER PUBLICATIONS

International Search Report; International Application No. PCT/US02/10971; Date of Completion: Nov. 20, 2002; 3 pages.
Dupont Teijin Films, "Mylar Polyester Film—Optical Properties", Jun. 2003, 2 pages.
International Search Report; International Application No. PCT/US03/16284; Date of Completion: Mar. 9, 2004; 3 pages.
www.store.moshimode.com; "iVisor AG for iPad 2 Black"; 2004-2010.
"Declaration of Jerome Aho"; Filed Aug. 3, 2007; Case 3:07-CV-00221-FDW-DCK; Includes: Exhibit A, Nascar Postcard (1 Page), Exhibit B, 50th Anniversary Nascar Letter Sent Jan. 7, 1998 (1 Page), and Exhibit C, Front Page of "The Official Nascar Preview and Press Guide" 1 page); 9 pages.
https://en.wikipedia.org/wiki/black_body, "Black Body", Jul. 2009, 11 pages.
https://en.wikipedia.org/wiki/bopet, "PET Film (biaxially oriented)", Jul. 2009, 4 pages.
https://en.wikipedia.org/wiki/Infrared, "Infrared", Jul. 2009, 12 pages.
Jake Gaecke; "Appletell Reviews the iVisor for iPad"; www.appletell.com; Sep. 15, 2010 at 12:32 p.m. www.technologytell.com/apple/60407/appletell-reviews-ag-for-i pad/; 2 pages.
www.store.moshimonde.com; "iVisor AG iPad Screen Protector"; Jul. 2010; 7 pages.
www.store.moshimonde.com; "iVisor AG for iPhone 4/4S Black"; Nov. 2010; 5 pages.
www.store.moshimonde.com; "iVisor AG for iPhone 4/4S White"; May 2010; 4 pages.
www.store.moshimonde.com; "iVisor AG for iPad 2 Black"; Mar. 2011; 5 pages.
www.store.moshimonde.com; "iVisor AG for iPad 2 White"; Mar. 2011; 3 pages.
Dictionary. com (http://dictionary.reference.com) 2012.
Defendant's Motion for Summary Judgment; Oct. 25, 2013; pp. 1-31.
PCT Search Report & Written Opinion for PCT/US2015/036248 (Sep. 16, 2015).
Hostaphan RBB, "Transparent, Temperature Stable Polyester Film for Cooking & Roasting Bags" Jul. 2016.
Hostaphan Win, "White, Long-Term Stable, Thermally Stable Polyester Film for PV Back Sheet Laminates"; Jul. 2016.
*Racing Optics, Inc.* v. *Aevoe, Inc., d/b/a/ Moshi*; Case No. 15-cv-017744-JCM-VCF; Aevoe's Initial Disclosure Non-Infringement, Invalidity and Unenforceability Contentions (Redacted) dated Jan. 7, 2016.
Saudi Basic Industries Corporation (SABIC); "The Department of Transportation [DOT] Guidebook"; Oct. 2016.
European Search Report for Application No. 15809,930. 9-107 / 3157480 (Dec. 15, 2017).
Australian Examination Report for Application Serial No. 2015277196 (Oct. 18, 2018).
Canadian Office Action for Application Serial No. 2,952,436 (May 3, 2019).
Canadian Office Action for Application Serial No. 2,952,436 (Nov. 15, 2019).
PCT Search Report & Written Opinion for PCT/US2019/054565 (Dec. 20, 2019).
<https://www.opentip.com/product.php?products_id=11699030>, May 5, 2020, 3 pages.
Brim Shield, photographs, Apr. 21, 2020, 1 pages.
Eli N. Perencevich, Moving Personal Protective Equipment Into the Community Face Shields and Containment of COVID-19, Apr. 29, 2020, 2 pages.
Hatshield, Shield Yourself With the Hatshield <https://www.hatshield.com/?gclid=CjwKCAjwp- X0BRAFEiwAheRui1u89v_3URuiwEVvBRGa9TaEfWoZVMJXRkWsZgPTUw-0fHJ5HD-8uhoCc84QAvD_BwE>, Apr. 17, 2020, 11 pages.
Instashield LLC, Bionic Wrench® Inventor Creates Low-Cost Face Shield for Masses, Apr. 15, 2020, 3 pages.
Leigh Buchanan, These 2 Companies Are Making Face Shields for Everyone <https://www.inc.com/leigh-buchanan/face-shields-coronavirus-protection-open-source. html>, May 6, 2020, 8 pages.
Tom Zillich, Surrey manufacturer hopes to hit home run with face shield that clips to baseball cap, Apr. 29, 2020, 3 pages.
F7e1-4b8b-9d02-4bd86f5158c5&pd rd wg=qkB2b&pf rd r=M%E2%80%A6>, May 6, 2020, 7 pages.
F7e1-4b8b-9d02-4bd86f5158c5&pd_rd_wg=pxuOs&pf_rd_r=PNDA%E2%80%A6>, May 5, 2020, 8 pages.
Invisible Gadget Guard, the Original "; 1 page".
Protect Your iPhone 4 with Screen Protectors from Incipo "; 3 pages".
What Makes NuShield Screen Protectors Superior ", 2 pages".
Something You Want "; 2 pages".
Apple iPad 2 (Wi-Fi 3G) Screen Protector "; 2 pages".
PCT International Application No. PCT/US99/25128 with International Search Report, Date of Completion Jan. 18, 2000, 54 Pages.
Mos Nordion, "Gamma Compatible Materials," Datasheet, Aug. 2007, 4 pages, <https://ab-div-bdi-bl-blm.web.cern.ch/Radiation/Gamma_Compatible_Materials_List_company.pdf>, retrieved on Sep. 29, 2021.
Li, H.-M. et al., "Influence of weight ratio in polymer blend film on the phase separation structure and its optical properties", The European Physical Journal Applied Physics, 45, 20501, published Jan. 31, 2009, EDP Sciences, 4 pages.
www.wikipedia.org. "Black Body", Jul. 2009, 11 pages.
www.wikipedia.org. "Infrared", Jul. 2009, 12 pages.
www.wikipedia.org. "PET Film (biaxially oriented)", Jul. 2009, 4 pages.
Zhang, Xin_Xiang et al., Abstract of "One-step sol-gel preparation of PDMS-silica ORMOSILs as environment-resistant and crack-free thick antireflective coatings," Journal of Materials Chemistry, Issue 26, 2012, <http://pubs.rsc.org/en/ content/articlelanding/2012/m/c2j m31005h#!div Abstract>.
"Anti-reflective coating," Wikipedia, last updated Jul. 13, 2017 by Andy Dingley, <https://en.m.wikipedia.org/wiki/Anti-reflective_coating>.
"Monotonic function," Wikipedia, accessed May 24, 2017, <https://en.wikipedia.org/wiki/Monotonic_function>.
"Thin Film," Wikipedia, last updated Jun. 20, 2017, <https://en.wikipedia.org/wiki/Thin_film>.
"Tips to Get Quality Anti-Reflection Optical Coatings," Penn Optical Coatings, accessed May 24, 2017, <http://www.pennoc.com/tipsgetqualityantireflectionopticalcoatings/>.
Chemical Book, "Benzophenone", https://www.chemicalbook.com/Chemical ProductProperty_EN_CB57 44679.htm, available at least as of 2017, accessed on line on Dec. 15, 2021 (Year: 2017.
Chemical Book, "Polymethylhydrosiloxane", https://www.chemicalbook.com/Chemical ProductProperty _EN_ CB3694969.htm, available at least as of 2017, accessed online on Dec. 15, 2021 (Year: 2017.
Chemical Book, Bis(1,2,2,6,6-pentamethyl-4-piperidyl) sebacate, available online at least as of 2017, https://www.chemicalbook.com/ChemicalProductProperty_EN_CB8121619.htm, accessed online Mar. 15, 2022 (Year: 2017).

(56) References Cited

OTHER PUBLICATIONS

PCT International Search Report and Written Opinion for International Application No. PCT/US2017/044438, dated Oct. 23, 2017, 12 pages.
Guide Chem, "UV Stabilizer", https://wap.guidechem.com/trade/uv-stabilizer-uv-absorber-ligh-id3578792.html, available at least as of 2018, accessed online on Dec. 15, 2021 (Year: 2018).
PCT International Search Report and Written Opinion for International Application No. PCT/US20/24639, Jun. 11, 2020, 13 pages.
PCT International Search Report and Written Opinion for International Application No. PCT/US2020/024639; Jun. 11, 2020.
PCT International Search Report and Written Opinion for International Application No. PCT/US2020/049919; Nov. 27, 2020.
PCT International Search Report and Written Opinion for International Application No. PCT/US2020/062230; Feb. 8, 2021.
Pulse Racing Innovations, EZ Tear Universal Single Pull Tearoff Ramp, webpage <https://www.pulseracinginnovations.com>, Dec. 30, 2020, 6 pages.
PCT International Search Report and Written Opinion for International Application No. PCT/US2021/026165, dated Jul. 9, 2021, 10 pages.
PCT International Search Report and Written Opinion for International Application No. PCT/US21/20421, May 20, 2021, 8 pages.
Pearson Dental, "UV Protection Face Shields", https://www.pearsondental.com/catalog/subcat_thumb.asp?majcatid=750&catid=10149, available online at least as of Jan. 27, 2021 per Internet Archive, accessed online on Sep. 15, 2021. (Year: 2021).
Patent Cooperation Treaty, International Search Report and Written Opinion for International Application No. PCT/US2022/031823, mailed Jul. 14, 2022, 11 pages.
Patent Cooperation Treaty, International Search Report and Written Opinion for International Application No. PCT/US2022/046171, mailed Jan. 18, 2023, 15 pages.
European Patent Office, Extended European Search Report for European Application No. 20863965.8, Aug. 21, 2023, 8 pages.
Patent Cooperation Treaty, International Search Report and Written Opinion for International Application No. PCT/US2023/012316, mailed Apr. 14, 2023, 11 pages.
Patent Cooperation Treaty, International Search Report and Written Opinion for International Application No. PCT/US2023/26598, mailed Sep. 12, 2023, 7 pages.
Canadian Intellectual Property Office, Office Action for Application No. 3,138,155, Dec. 19, 2024, 3 pages.
European Patent Office, Communication pursuant to Article 94(3) EPC, Nov. 14, 2024, 4 pages.
Patent Cooperation Treaty, International Search Report and Written Opinion for International Application No. PCT/US2024/052837, mailed Nov. 14, 2024, 6 pages.
State Intellectual Property Office, English translation of First Examination Opinion Notice for Chinese Application No. 202080071482.3, May 11, 2024, 22 pages.
State Intellectual Property Office, English translation of Second Examination Opinion Notice for Chinese Application No. 202080071482.3, Oct. 17, 2024, 18 pages.
Monitor Protection Device for a Flat Panel Display ", 11 pgs."
Exhibit 1006—Japanese Application No. JP 2002-328613 to Kitaguchi Translation; IPR2016-01745; at least as early as Sep. 7, 2016; pp. 1-10.
Ballato, John, Expert Report of John Ballato, Ph.D., Nov. 12, 2007, 5 pgs.
Ballato, John, Supplemental Expert Report of John Ballato, Ph.D., Nov. 19, 2007, 10 pgs.
Barnhardt, John J. III, Notice Pursuant to 35 U.S.C. 282, Dec. 18, 2007, 3 pgs.
Barnhardt, John J. III, Redacted Version Defendants' Memorandum in Support of Motion for Partial Summary Judgment, Dec. 3, 2007, 36 pgs.
Russell, Geoffrey A, Rebuttal Report of Geoffrey A Russell, Ph.D., on issues raised in the Export Report of John Ballato, Ph.D., Nov. 21, 2007, 15 pgs.
Professional Plastics (http://www.professionalplastics.com/MelinexPETFilmDupont) 2012.
Counterclaims—Jury Trial Demanded; Nov. 2, 2015; 15 pages.
Gregory Brower et al.; "Complaint for Patent Infringement"; Sep. 15, 2015; 15 pages.
Jeffrey A Silverstri et al.; "Answer to Complaint for Patent Infringement"; Oct. 7, 2015; 59 pages.
*Aevoe Corp. v. Racing Optics, Inc.*; Notice of Filing Date; Case IPR2016-01745; Inter Partes Review of U.S. Pat. No. 8,974,620; at least as early as Sep. 6, 2016; p. 1-5.
*Aevoe Corp. v. Racing Optics, Inc.*; Mandatory Notices; Case IPR2016-01745; Inter Partes Review of U.S. Pat. No. 8,974,620; at least as early as Sep. 7, 2016; pp. 1-4.
*Aevoe Corp. v. Racing Optics, Inc.*; Petitioner's Power of Attorney; Case IPR2016-01745; Inter Partes Review of U.S. Pat. No. 8,974,620; at least as early as Sep. 7, 2016; pp. 1-3.
*Aevoe Corp. v. Racing Optics, Inc.*; Power of Attorney; Case IPR2016-01745; Inter Partes Review of U.S. Pat. No. 8,974,620; at least as early as Sep. 7, 2016; pp. 1-4.
Examiner's search strategy and results for U.S. Appl. No. 15/090,681; Aug. 21, 2016; 2 pages.
Exhibit 1001—U.S. Pat. No. 8,974,620 to Wilson et al.; Case IPR2016-01745; Inter Partes Review of U.S. Pat. No. 8,974,620; at least as early as Sep. 7, 2016; pp. 1-15.
Exhibit 1002—U.S. Pat. No. 5,364,671 to Gustafson; Case IPR2016-01745; Inter Partes Review of U.S. Pat. No. 8,974,620; at least as early as Sep. 7, 2016; pp. 1-6.
Exhibit 1004—U.S. Pat. No. 7,351,470 to Draheim et al; Case IPR2016-01745; Inter Partes Review of U.S. Pat. No. 8,974,620; at least as early as Sep. 7, 2016; pp. 1-15.
Exhibit 1005—U.S. Pat. No. 7,957,524 to Chipping; Case IPR2016-01745; Inter Partes Review of U.S. Pat. No. 8,974,620; at least as early as Sep. 7, 2017; pp. 1-20.
Exhibit 1007—U.S. Appl. No. 13/838,311; Response to Office Action; Case IPR2016-01745; Inter Partes Review of.
Exhibit 1008—U.S. Appl. No. 13/838,311; Response and Request for Continued Examination; Case IPR2016-01745; Inter Partes Review of U.S. Pat. No. 8,974,620; at least as early as Sep. 7, 2016; pp. 1-21.
Exhibit 1010—U.S. Appl. No. 15/838,311; Notice of Allowance; Case IPR2016-01745; Inter Partes Review of U.S. Pat. No. 8,974,620; at least as early as Sep. 7, 2016; pp. 1-8.
List of References cited and considered for U.S. Appl. No. 15/090,681; Receipt date Apr. 27, 2016; 4 pages.
List of References cited and considered for U.S. Appl. No. 15/090,681; Receipt date Jun. 30, 2016; 3 pages.
U.S. Pat. No. 8,974,620; at least as early as Sep. 7, 2016; pp. 1-32.
U.S. Pat. No. 8,974,620; at least as early as Sep. 7, 2016; pp. 1-55.
United States Patent and Trademark Office; Office Action for U.S. Appl. No. 15/090,681; Aug. 26, 2016; 8 pages.
United States Patent and Trademark Office; Office Action dated Dec. 21, 2016 pertaining to U.S. Appl. No. 15/090,681, filed Apr. 5, 2016; 8 pages.
Office Action for Canadian Patent Application No. 2,952,436; Jul. 8, 2020.
PCT Search Report and Written Opinion for US2020/016245 (Apr. 28, 2020).

* cited by examiner

PROTECTIVE BARRIER FOR SAFETY GLAZING

CROSS-REFERENCE TO RELATED APPLICATIONS

This application is a continuation of U.S. application Ser. No. 18/786,149, filed Jul. 26, 2024, which is a continuation of U.S. application Ser. No. 18/478,220, filed Sep. 29, 2023, now U.S. Pat. No. 12,077,037, issued Sep. 3, 2024, which is a continuation of U.S. application Ser. No. 18/062,901, filed Dec. 7, 2022, now U.S. Pat. No. 11,807,078, issued Nov. 7, 2023, which is a continuation of U.S. application Ser. No. 16/866,392, filed May 4, 2020, now U.S. Pat. No. 11,548,356, issued Jan. 10, 2023, which relates to and claims the benefit of U.S. Provisional Application No. 62/987,726, filed Mar. 10, 2020 and entitled "PROTECTIVE BARRIER FOR SAFETY GLAZING," the entire contents of which is expressly incorporated herein by reference.

STATEMENT RE: FEDERALLY SPONSORED RESEARCH/DEVELOPMENT

Not Applicable

BACKGROUND

1. Technical Field

The present disclosure relates generally to safety glazing and, more particularly, to a protective barrier applied to the exterior of a vehicle windshield.

2. Related Art

Currently, vehicle windshields are being manufactured to include opto-electric devices such as cameras, rain sensors, proximity sensors, heads-up displays, defrosters, and antennas. This has increased the cost of replacing a cracked windshield by a factor of 10. In addition, costly calibration procedures must be performed after the installation of a new windshield, further increasing the costs associated with replacing the windshield.

The American National Standards Institute (ANSI) Z26.1-1996 standard, entitled "Safety Glazing Materials for Glazing Motor Vehicles and Motor Vehicle Equipment Operating on Land Highways," is a standard that specifies the durability and safety requirements to qualify materials for vehicle glazing. Among the various tests mandated by the standard are transmission, humidity, heat, impact, fracturing, penetration, distortion, weathering, haze, and abrasion resistance. Applicable standards such as the Z26.1-1996 standard currently specify sixteen categories of construction for safety glazing allowable in various locations on the vehicle. The most stringent category is for windshields because of the need for visual acuity, impact resistance, and abrasion resistance from pitting and wiper blades, as well as the need to contain glass fragments to prevent them from injuring passengers.

The two basic groups of construction materials for windshields are glass and plastics. Per applicable standards, plastics are relegated to vehicles such as motorcycles, and the windshield is only allowed to be 15 inches higher than the seat so that the rider can look over it. This is because the plastics available today are so soft that they abrade easily, reducing visual acuity of the windshield after only a short service life. Considering their limited use, the abrasion test for plastics (e.g. test 5.17 specified in the ANSI Z26.1-1996 standard) only requires 100 cycles of Taber abrasion. This is 10 times less than the requirement for glass, which is 1,000 cycles of Taber abrasion. On the other hand, plastic could be a preferred material because it does not produce the sharp fragments that glass does with impacts and is half the weight. Although glass is hard and abrasion resistant, its low tensile strength makes it subject to pitting. In addition, on impact it produces dangerous sharp fragments that can injure the passengers. To mitigate this safety issue, glass windshields may be laminated with a soft plastic core to hold the fragments together and improve penetration resistance.

There are no commercially available safety barrier films for windshields that meet applicable requirements for weathering for one year (e.g. test 5.16 specified in the ANSI Z26.1-1996 standard), abrasion of plastics (e.g. test 5.17 specified in the ANSI Z26.1-1996 standard), and abrasion of glass (e.g. test 5.18 specified in the ANSI Z26.1-1996 standard), as shown in the table below:

| ANSI Z26 FOR WINDSHIELDS | | | | | |
|---|---|---|---|---|---|
| Material | Test # | Initial Haze | Haze after Weathering | Taber Revolutions | Outdoor Exposure |
| Plastic | 5.17.3 | N/A | 15% | 100 | 1 year |
| Hard Plastic | 5.17.4 | 1% | 10% | 500 | 1 year |
| Glass/Plastic | 5.17.3 | N/A | 4% | 100 | Plastic on Interior |
| Glass | 5.18 | N/A | 2% | 1,000 | 1 year |

In today's commercial market, the existing polymer safety films for protecting glass windows are mounted to the interior of the building or vehicle. These commercial products would not last more than a few months if mounted to the exteriors, due to the embrittlement of the polyester substrate. This allows fracturing of the hard coating on the surface, and thus a failure of the film. The durability of interior mounted safety films to windows is specified in ANSI Z97.1-2015, entitled "American National Standard for Safety Glazing Materials Used in Buildings-Safety Performance Specifications and Methods of Test." An example of such an interior mounted safety film is a 3M Scotch-shield safety and security window film Ultra Series, having a thickness of 8 mil, a peel strength of 2,000 g/in, a transmission of greater than 88%, substantially no distortion at 45 degrees angle of incidence, and an abrasion resistance of 5% haze after 100 Taber cycles. While such a film may have a service life of 10 years, it is not manufactured for exterior usage and the abrasion resistance does not qualify for ANSI Z26 windshield usage (e.g. less than 2% haze after 1,000 Taber cycles).

In the case of interior mounting of a safety film such as the above 3M film, the glass window itself may provide protection from portions of the UV and IR spectrum. The addition of UV inhibitors mixed into the mounting adhesive may be enough to provide a long service life (e.g. 10 years) of the film and hard coated surface facing the interior. However, the exterior glass surface remains subject to pitting due to the low tensile strength of the glass.

The only commercially available safety film for exterior use on vehicles operating on land highways is made by Clear-Plex. According to Clear-Plex's published commercial specification and related U.S. Pat. Nos. 7,992,917 and 9,023,162, the Clear-Plex safety film includes a layer of 4 mil thick PET with a hard coat and pressure sensitive adhesive for mounting and has a peel strength of 1,800 g/in, a transmission of greater than 87%, substantially no distortion at 40 degrees angle of incidence, and an abrasion resistance of 0.5% haze after 100 cycles before weathering. Clear-Plex does not claim any testing performed to ANSI Z26 standards. The haze value may be acceptable for plastic, but the commercial specification does not include Taber testing after 1 year of weathering.

There exist other products that may be mounted onto windshield exteriors of vehicles that do not operate on land highways, such as vehicles used in stockcar racing or military vehicles. One such product, by Racing Optics, Inc., is a 4-layer×4 mil safety film (hereinafter "RO 4×4") having a thickness of 18 mil (4 layers of 4 mil thick PET with a hard coat and pressure sensitive adhesive on each layer), a peel strength of 100 g/in for the upper layers and 400 g/in for the base layer, a transmission of greater than 88%, a Z26 haze test #5.17 result of less than 1.5% haze before weathering, a Z26 abrasion test #5.16 result of less than 5% haze after 100 Taber cycles, and a Z26 weatherability test #5.15 result of less than 4 months per layer (e.g. transmittance noticeably reduced after 3-4 months weathering, resulting in a haze of about 20-50% without Taber testing). Because the RO 4×4 product is designed for a short-term service life (which is renewed as each layer is peeled off during use), it does not have the weather durability or abrasion resistance required to meet the Z26 standard for a windshield of a vehicle operating on land highways.

BRIEF SUMMARY

The present disclosure contemplates various systems and methods for overcoming the above drawbacks accompanying the related art. According to one or more aspects of the present disclosure, an external barrier may be added to both glass and plastic windshields to improve abrasion resistance, pitting, and impact cracking. The external barrier may increase the safety of passengers as well as reduce the number one insurance cost of the national fleet of vehicles, namely windshield damage, all while reducing the carbon footprint of replacing a glass windshield.

One aspect of the embodiments of the present disclosure is a protective barrier affixable to a curved substrate. The protective barrier may comprise a stack of two or more lenses, each of the two or more lenses including a polyethylene terephthalate (PET) film, a hard coat on a first side of the PET film, and an adhesive layer on a second side of the PET film opposite the first side. The stack of two or more lenses may have a modulation transfer function that exhibits a contrast value greater than 75% for a spatial resolution of one line-pair per 0.0003 radians at 65 degrees angle of incidence.

The modulation transfer function of the stack of two or more lenses may exhibit a contrast value greater than 70% for a spatial resolution of one line-pair per 0.0003 radians at 70 degrees angle of incidence. The modulation transfer function of the stack of two or more lenses may exhibit a contrast value greater than 85% for a spatial resolution of one line-pair per 0.0003 radians at 55 degrees angle of incidence. The modulation transfer function of the stack of two or more lenses may exhibit a contrast value greater than 90% for a spatial resolution of one line-pair per 0.0003 radians at 45 degrees angle of incidence.

The PET film of each of the two or more lenses may have a modulation transfer function that exhibits a contrast value greater than 80% for a spatial resolution of one line-pair per 0.0003 radians at 65 degrees angle of incidence.

Each of the two or more lenses may be 2-4 mil thick.

The PET film of each of the two or more lenses may include UV stabilizers. The hard coat and the adhesive layer of each of the two or more lenses may include UV stabilizers.

The PET film of each of the two or more lenses may have a machine direction shrinkage of 0.6%-1.8% and a transverse direction shrinkage of 0.3%-1.1% at 150° C.

Another aspect of the embodiments of the present disclosure is a method. The method may comprise stacking two or more lenses, each of the two or more lenses including a polyethylene terephthalate (PET) film, a hard coat on a first side of the PET film, and an adhesive layer on a second side of the PET film opposite the first side. The stack of two or more lenses may have a modulation transfer function that exhibits a contrast value greater than 75% for a spatial resolution of one line-pair per 0.0003 radians at 65 degrees angle of incidence. The method may comprise placing the stack of two more lenses on a curved substrate with the adhesive of a first lens of the stack in contact with the curved substrate and applying heat and pressure to conform the stack of two or more lenses to the shape of the curved substrate.

The applying of heat and pressure may be performed at least in part prior to the adhesive layer of each of the two or more lenses being fully cured. The applying of heat and pressure may be performed at least in part prior to the adhesive layer of each of the two or more lenses exceeding a peel strength of 25 grams per inch determined as a constant load per unit width needed for peeling.

The method may comprise peeling off an outermost lens of the stack of two or more lenses after the applying of heat and pressure.

The adhesive of the first lens of the stack of two or more lenses may be stronger than the adhesive of an outermost lens of the stack of two or more lenses.

The modulation transfer function of the stack of two or more lenses may exhibit a contrast value greater than 70% for a spatial resolution of one line-pair per 0.0003 radians at 70 degrees angle of incidence.

The PET film of each of the two or more lenses may have a modulation transfer function that exhibits a contrast value greater than 80% for a spatial resolution of one line-pair per 0.0003 radians at 65 degrees angle of incidence.

Each of the two or more lenses may be 2-4 mil thick.

The PET film of each of the two or more lenses may include UV stabilizers. The hard coat and the adhesive layer of each of the two or more lenses may include UV stabilizers.

The PET film of each of the two or more lenses may have a machine direction shrinkage of 0.6%-1.8% and a transverse direction shrinkage of 0.3%-1.1% at 150° C.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The present disclosure encompasses various embodiments of a protective barrier affixable to a curved substrate and methods of manufacture, installation, and use thereof. The detailed description set forth below in connection with the appended drawings is intended as a description of several currently contemplated embodiments and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that relational terms such as first and second and the like are used solely to distinguish one from another entity without necessarily requiring or implying any actual such relationship in order between such entities.

Figure 1:
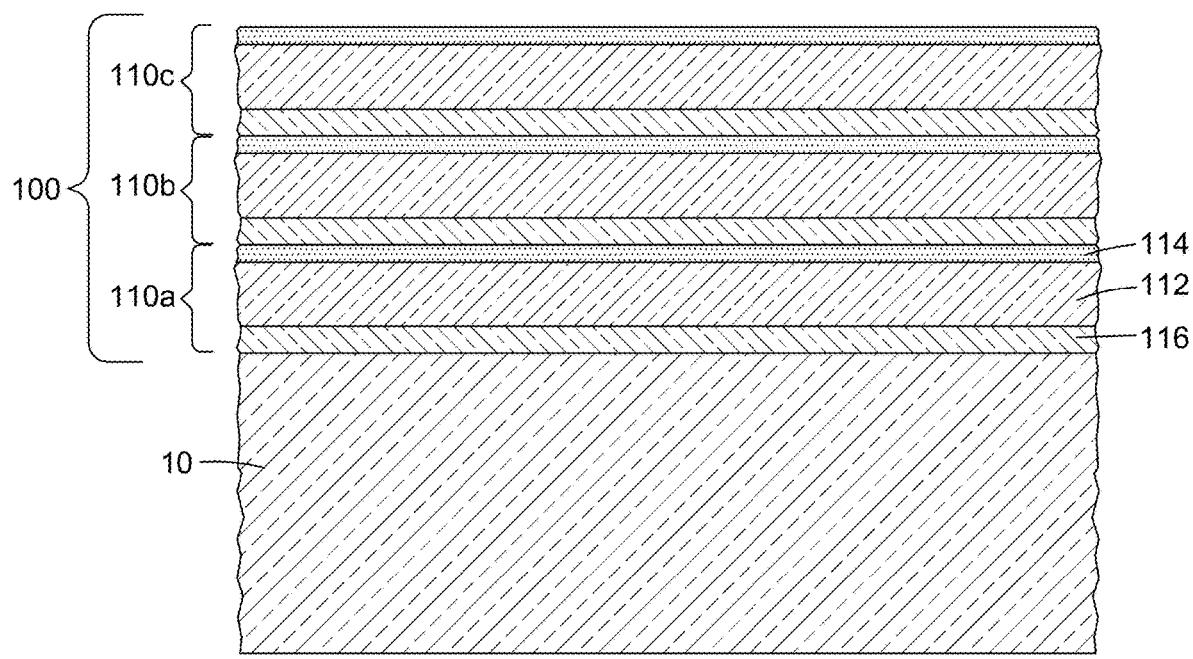
FIG. 1 is a cross-sectional view of a protective barrier according to an embodiment of the present disclosure.

FIG. 1 is a cross-sectional view of a protective barrier 100 according to an embodiment of the present disclosure. The protective barrier 100 may be affixed to a curved substrate 10 such as a windshield of an automobile and may comprise a stack of two or more lenses 110 such as the lenses 110a, 110b, 110c shown in FIG. 1. Each of the lenses 110 may include a polyethylene terephthalate (PET) film 112, a hard coat 114 on a first side of the PET film 112, and an adhesive layer 116 on a second side of the PET film 112 opposite the first side for bonding the lenses 110 together and to the curved substrate 10. The stack of lenses 110 may have a modulation transfer function at 65 degrees angle of incidence that exhibits a contrast value greater than 75% for a spatial resolution of one line-pair per 0.0003 radians, the approximate resolution of the human eye. By controlling the modulation transfer function of the stack of lenses 110 in this way, a protective barrier 100 may be produced that is substantially distortion-free (e.g. less than 0.00045 radians displacement) when viewed at an angle of incidence typical of automobile windshields (e.g. 60-70 degrees), even while the total thickness of the protective barrier 100 is sufficient to resist impact damage at automobile speeds. In this way, the protective barrier 100 can prevent cracking and pitting of the underlying windshield 10 while meeting the durability requirements for windshield use on highways.

Distortion is a visual acuity error caused by a displaced object in the far field (e.g. 40-1,000 feet). Safety glazing can have localized zones which cause object displacements perceived as distortion, where an object may appear to jump from one position to another when viewed from a slightly different position or angle. Conventionally, distortion is only qualitatively determined, for example, by test 5.15 specified in the ANSI Z26.1-1996 standard. This test uses a shadow graph in a long tunnel with a collimated light source and white screen. The technician places a specimen in the light path at normal angle of incidence, 15 inches from the screen. The technician then looks for dark and light artifacts caused by distortion. The test has no quantitative criteria and does not address distortion at the high angle of incidence used in modern car windshields (e.g. 60-70 degrees).

Ideally, the distortion should be minimized to the resolution of the human eye with 20/20 vision, which is about one line-pair per 0.0003 radians. If an object is displaced by 0.0006 radians, for example, then the eye will perceive the location change as distortion. Effectively, then, distortion must be reduced such that any object displacement is below the resolution capability of the human eye in order to be considered distortion-free. Meanwhile, when safety glazing is viewed at high angles of incidence (e.g. 60-70 degrees), the optical thickness increases as a function of the cosine of the angle according to Snell's law. This may cause any distortion effects to be amplified, especially for safety film thicker than around 4 mil as may be needed to resist impact damage at automobile speeds.

Figure 2:
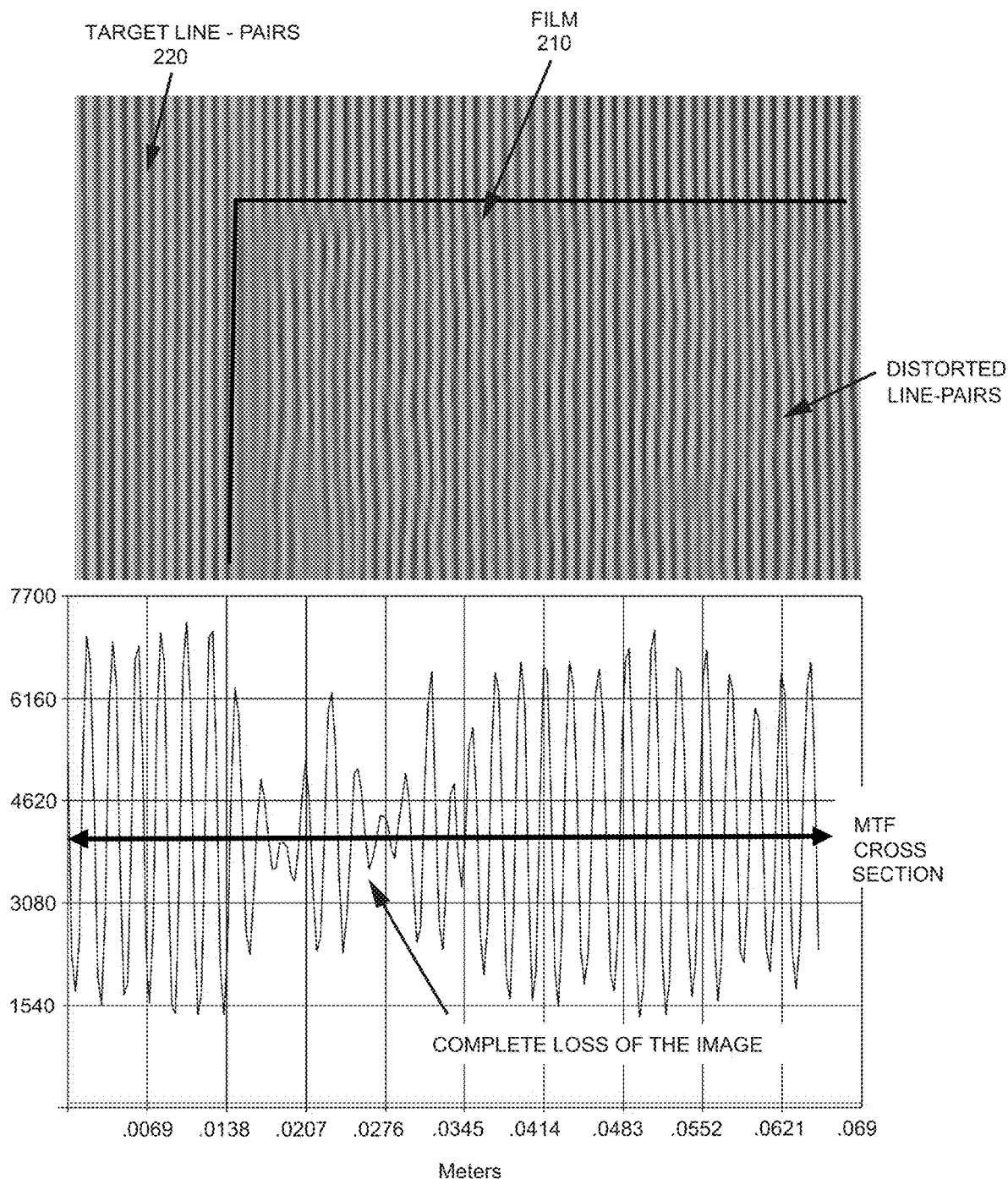
FIG. 2 is an image and graphical representation of visual distortion in a safety film.

FIG. 2 is an image and graphical representation of visual distortion in a safety film 210. In order to quantitatively measure distortion, it is contemplated that the modulation transfer function of a test material such as the safety film 210 may be evaluated at a fixed spatial frequency of 0.0003 radians, corresponding to the resolution of the human eye with 20/20 vision. To this end, as shown in the upper part of FIG. 2, an image of a test pattern 220 such as a checkerboard pattern or target line-pairs spaced by 0.0003 radians may be captured through the film 210 at a desired angle of incidence (e.g. 65 degrees in FIG. 2). The lower part of FIG. 2 shows the corresponding modulation transfer function data representing the contrast as a function of horizontal position for a given cross-section of the data representing a single horizontal slice of the image. As can be seen, the modulation transfer function data exhibits reduced contrast, corresponding to distorted line-pairs, in the area of the test pattern 220 that is viewed through the film 210. In some places, the modulation transfer function data exhibits such low contrast as to amount to complete loss of the image.

A test setup such as that of FIG. 2 may be used to evaluate materials and process parameters for manufacturing the protective barrier 100 described herein. In particular, by using such a test setup and/or test results derivable therefrom, appropriate materials and process parameters may be selected and/or adjusted to control the modulation transfer function of the stack of lenses 110 at one or more desired angles of incidence. In this regard, it is contemplated that the modulation transfer function of the stack of lenses 110 may be controlled according to the methodology described in commonly owned U.S. Provisional Application No. 62/942,943, filed Dec. 3, 2019 and entitled "METHOD AND APPARATUS FOR REDUCING NON-NORMAL INCIDENCE DISTORTION IN GLAZING FILMS," the entire contents of which is expressly incorporated herein by reference.

For example, at any or all stages of producing the stack of lenses 110 (e.g. during the formation of the PET film 112 by melting a resin, extruding the melted resin through a die to produce a film, and cooling the film, during the applying of the hard coat 114, during the applying of the adhesive layer 116, etc.), one or more images of the test pattern 220 may be captured through the lens 110 or stack of lenses 110 being produced. The image(s) may be captured, for example, by aiming an image capturing device through a roll-to-roll processing web containing the lens 110 or stack of lenses 110 at one or more desired angles of incidence. On the basis of such image(s), a computer may calculate the MTF data and produce an output used for adjusting process parameters that are found to effect the modulation transfer function of the lens 110 or stack of lenses 110, such as a temperature setting of a heater used in melting the resin (e.g. absolute temperature or relative temperatures of a gradient or profile of a plurality of heated regions of an extruder assembly), a rotation speed of an extrusion screw (which may determine melting time as well as degree of mixing of the resin), a rotation speed of one or more rollers (which may determine cooling time and/or a degree of force acting on the polymer film during cooling), a flow speed, deposition speed, or other application speed of the hard coat 114 or adhesive layer 116, and/or a speed at which the lenses 110 are stacked. It is contemplated, for example, that the PET film 112 may in some cases be prefabricated and selected for its known MTF data, whereas the modulation transfer function of the stack of lenses 110 may be actively controlled during the application of the hard coats 114 and/or adhesive layers 116 and the stacking of the lenses 110. In other cases, the PET film 112 may also be manufactured while actively controlling the modulation transfer function thereof. The output of the computer may include, for example, a feedback signal for automatically adjusting the relevant process parameters without user input in either a continuous or batch-to-batch process. As another example, the output may include a visual representation of the data to be interpreted by an operator who will make the necessary adjustments manually.

Figure 3:
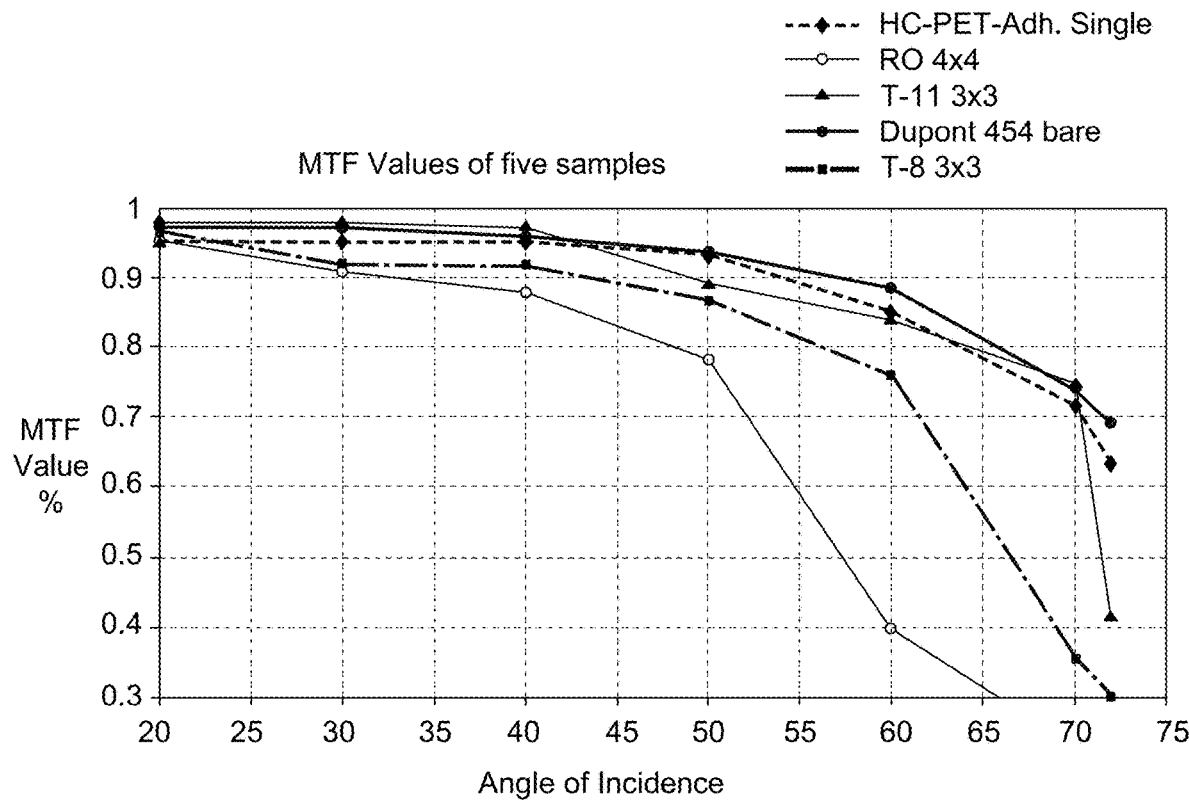
FIG. 3 is a graphical representation of modulation transfer function (MTF) data for five samples at different angles of incidence.

FIG. 3 is a graphical representation of modulation transfer function data for five samples at different angles of incidence. To produce the example data of FIG. 3, modulation transfer function data as described in FIG. 2 may be taken at angles of incidence from normal (zero degrees) to 70 degrees in increments of 10 degrees. It is contemplated that the data may be normalized to a modulation transfer function value representing a windshield without any protective barrier. Because many car windshields are installed with a slant of 65 degrees, additional data may be captured at 65 degrees, or likewise any other angle of particular interest. As represented in FIG. 3 by the solid line with triangular datapoints, the sample labeled T-11 3×3 may serve as the stack of lenses 110 of the protective barrier 100 described herein, having a modulation transfer function that exhibits a contrast value greater than 75% for a spatial resolution of one line-pair per 0.0003 radians at 65 degrees angle of incidence. As noted above, 65 degrees is a typical windshield slant. However, a driver must also observe objects above or below eye level, such that it may also be advantageous to minimize distortion at larger or smaller angles of incidence. To this end, as shown in the example of the sample labeled T-11 3×3, the modulation transfer function of the stack of lenses 110 may further exhibit, for the same spatial resolution of one line-pair per 0.0003 radians, a contrast value greater than 70% at 70 degrees angle of incidence, a contrast value greater than 85% at 55 degrees angle of incidence, and/or a contrast value greater than 90% at 45 degrees angle of incidence. A protective barrier 100 whose modulation transfer function is controlled in this way may be applied to a typical automobile windshield without distorting the positions of objects viewed by the driver.

An example of a prefabricated PET film 112 that may be selected for its known MTF data for use in the stack of lenses 110 is a PET film 112 having a modulation transfer function that itself exhibits a contrast value greater than 80% for a spatial resolution of one line-pair per 0.0003 radians at 65 degrees angle of incidence. One such material is a film sold under the name MELINEX® 454 by DuPont Teijin Films, which is represented in FIG. 3 by the solid line with circular datapoints. The dashed line with diamond datapoints represents a sample of a lens 110 made using this film as the PET film 112 thereof, with the hard coat 114 and the adhesive layer 116 having been applied under MTF control as described above. That is, during the processes of applying the hard coat 114 and the adhesive layer 116, one or more process parameters were selected or adjusted (either continuously or batch-to-batch) to control the modulation transfer function at one or more angles of incidence, for example, to maintain a contrast value greater than 75% for a spatial resolution of one line-pair per 0.0003 radians at 65 degrees angle of incidence. As can be seen, the MTF data of this sample, which represents only a single lens 110 in accordance with the disclosed subject matter, is substantially similar to that of the sample labeled T-11 3×3, which represents the entire protective barrier 100 including a stack of such lenses 110, despite the increased thickness of the stack. This may be achieved by stacking the lenses 110 under MTF control as described above.

In contrast, the sample labeled T-8 3×3, represented in FIG. 3 by the dash-dot line with square datapoints, was produced without MTF control. Despite being a similarly constructed 3-layer stack, the optical properties are markedly inferior at the high angles of incidence typically used in car windshields. For example, as shown in FIG. 3, the contrast value at 65 degrees angle of incidence is under 60%. Such a product can only be used in applications having an angle of incidence less than 60 degrees, where the contrast value remains above 75%. The sample labeled RO 4×4, represented by the solid line with circular datapoints and corresponding to the RO 4×4 product described above, is a 4-layer stack that was similarly produced without MTF control. This product exhibits even worse MTF data at relevant angles of incidence and can realistically only be used in applications where the angle of incidence is less than 50 degrees, after which the contrast value falls below 75%. It has been found that distortion may become noticeable below a contrast value of 75%.

Figure 4:
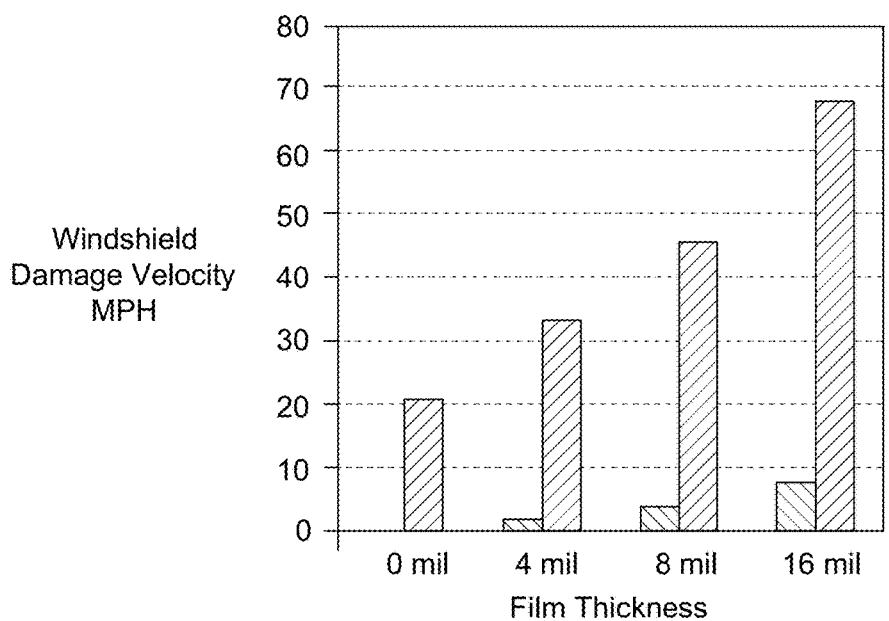
FIG. 4 is a graphical representation of windshield damage velocity for different film thicknesses.

FIG. 4 is a graphical representation of windshield damage velocity for different film thicknesses. The example data of FIG. 4 is based on the results of a glass fracture study conducted by O'Gara-Hess Armor Company for the U.S. military. Increasingly thick layers of PET were mounted on ballistic glass, and a three-quarters inch steel ball was launched at the glass at different velocities. The data shows the minimum velocity that resulted in glass cracking for each PET film thickness. In light of the data shown in FIG. 4, it is contemplated that the protective barrier 100 described herein should be 8 mil thick or thicker in order to protect a glass windshield at common driving velocities of 45-65 miles per hour, for example, 8 mil to 16 mil thick and preferably 10 mil to 16 mil thick. For example, the protective barrier 100 may include 2-4 lenses 110 (e.g. 3 lenses 110a, 110b, and 110c as shown in FIG. 1), where each of the lenses 110 is 4 mil thick.

In general, the increased thickness needed to protect a glass windshield poses several challenges to the production of the protective barrier 100. As described above, for example, the increased thickness may amplify distortion at high angles of incidence (e.g. 60-70 degrees). This challenge may be overcome by controlling the modulation transfer function of the protective barrier 100 as described above, for example, by producing a stack of lenses 110 having a modulation transfer function that exhibits a contrast value greater than 75% for a spatial resolution of one line-pair per 0.0003 radians at 65 degrees angle of incidence. Additional challenges posed by the thickness of the protective barrier 100 include making a product that can be successfully molded to a curved substrate 10 (e.g. an automobile windshield), achieving a high degree of weatherability and abrasion resistance and reduced haze, and maintaining a reasonably long service life. Each of these challenges may be overcome by the disclosed protective battier 100 as described in more detail below.

Figure 5:
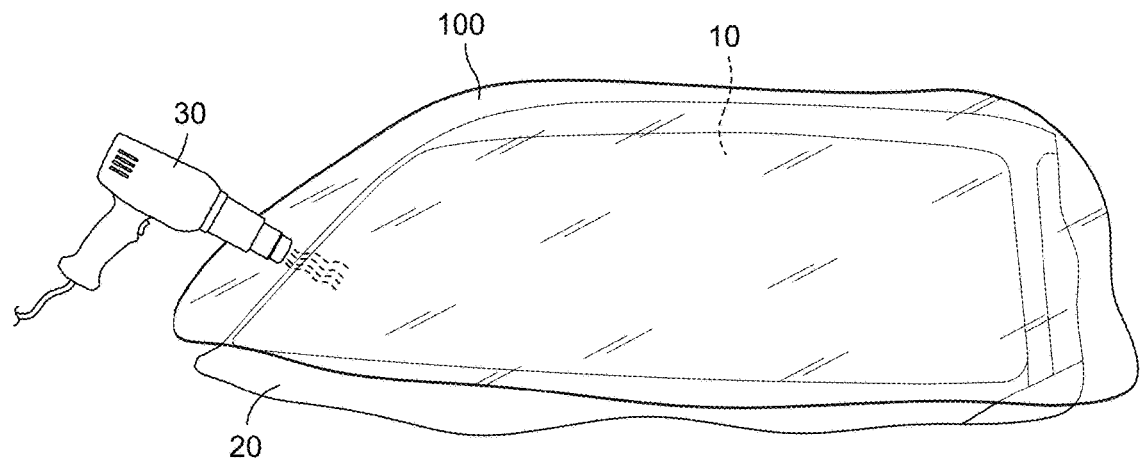
FIG. 5 shows the protective barrier placed on a windshield of a car at the beginning of a process of applying heat and pressure to mold the protective barrier to the shape of the windshield.

FIG. 5 shows the protective barrier 100 placed on a windshield 10 of a car 20 at the beginning of a process of applying heat and pressure to mold the protective barrier 100 to the shape of the windshield 10 (the windshield 10 serving as the substrate 10 shown in FIG. 1). The protective barrier 100 may be adhered to the windshield 10 by placing the adhesive layer 116 of a first (bottommost) lens 110a of the stack in contact with the windshield 10 (see FIG. 1). The adhesive layer 116 of the first lens 110a may be a dry mount adhesive as disclosed, for example, in U.S. Pat. No. 9,295,297 to Wilson, issued Mar. 29, 2016 and entitled "Adhesive Mountable Stack of Removable Layers," the entire contents of which is expressly incorporated herein by reference. Alternatively, a wet mount adhesive may be used as disclosed, for example, in U.S. Pat. No. 9,128,545 to Wilson, issued Sep. 8, 2015 and entitled "Touch Screen Shield," the entire contents of which is expressly incorporated herein by reference. The adhesive may be an acrylic adhesive such as an acrylic pressure sensitive adhesive (PSA).

The windshields of most cars exhibit a compound curvature, such that the protective barrier 100 will not conform to the windshield 10 without shrinking it in the upper and lower corners. Since the protective barrier 100 may be flat (e.g. having been manufactured in a roll-to-roll process), the stack of two or more lenses 110 may not initially conform to the curved shape of the windshield 10, resulting in regions of greater or less adhesion and pockets/bubbles of air between the stack of lenses 110 and the windshield. Therefore, in order to conform the stack of lenses 110 to the shape of the windshield 10, heat and pressure may be applied using a heater 30 such as a hot air source (e.g. a heat gun or blow dryer) or an infrared heater. At the same time, pressure may be applied to the stack of lenses 110 using a card or squeegee. In some cases, the protective barrier 100 may be applied using a sacrificial layer serving as a female mold cavity to sandwich the stack of lenses 110 between the sacrificial layer and the windshield 10 as described in commonly owned U.S. application Ser. No. 16/778,928, filed Jan. 31, 2020 and entitled "THERMOFORM WINDSHIELD STACK WITH INTEGRATED FORMABLE MOLD," the entire contents of which is expressly incorporated herein by reference.

As the installer heats and presses down on the stack of lenses 110, the stack of lenses 110 may shrink and stretch to take on the contour of the curved substrate 10 (the windshield). In the case of commercial films having a thickness of only 2 mil, the necessary shrinking may be easy to achieve. On the other hand, a monolithic film of 8 mil or thicker will crease before the film conforms to the windshield, making it unusable. In light of this challenge, the protective barrier 100 described herein uses multiple thin lenses 110 (e.g. 2-4 mil thick each) that individually shrink well. The adhesive layers 116 between the lenses 110 of the stack, which may be the same acrylic adhesive for example, may be only partially cured to produce an extremely low peel strength (e.g. 15-25 g/in) and high elasticity. As such, each individual lens 110 of the stack may "float" in relationship to each other, allowing shrinking to occur without creasing any of the lenses 110. Once the protective barrier 100 is installed and exposed to sunlight, for example, the adhesive layers 116 will cure and increase the peel and bonding strength (e.g. by a factor of 3 to 5), promoting a long service life. The peel strength after initial weathering may be 100-150 g/in, for example.

Figure 6:
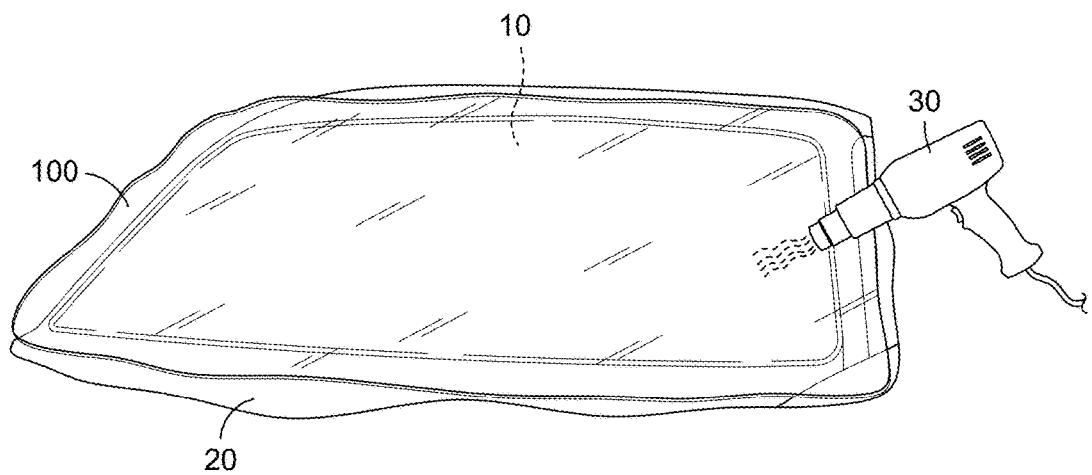
FIG. 6 shows the protective barrier on the windshield at the end of the process of applying heat and pressure.

FIG. 6 shows the protective barrier 100 on the windshield 10 at the end of the process of applying heat and pressure. At this stage, the desired shrinkage has occurred and the stack of lenses 110 of the protective barrier 100 is molded to the curved shape of the windshield 10 without air pockets/bubbles. The technical specifications of PET films include two axes of shrinking with different values, designated as the machine direction ("MD") and the transverse direction ("TD"). The machine direction refers to the direction of the roll stock in a roll-to-roll process used to produce the PET film, while the transverse direction refers to the direction across the roll direction. It is contemplated that the PET films 112 of the stack of the protective barrier 100 may have a machine direction shrinkage of 0.6%-1.8% (preferably 0.8%-1.0%) and a transverse direction shrinkage of 0.3%-1.1% (preferably 0.5%-0.6%) at 150° C. A PET films that has a machine direction shrinkage below 0.6% or a transverse direction shrinkage below 0.3% will not have enough shrink to conform to a windshield. On the other hand, if the shrinkage is to high, e.g. greater than 1.8% in the machine direction or greater than 1.1% in the transverse direction, it will be too difficult for the installer to control the shrinkage in a hand-operated procedure (e.g. using the heater 30 as described above).

Figure 7:
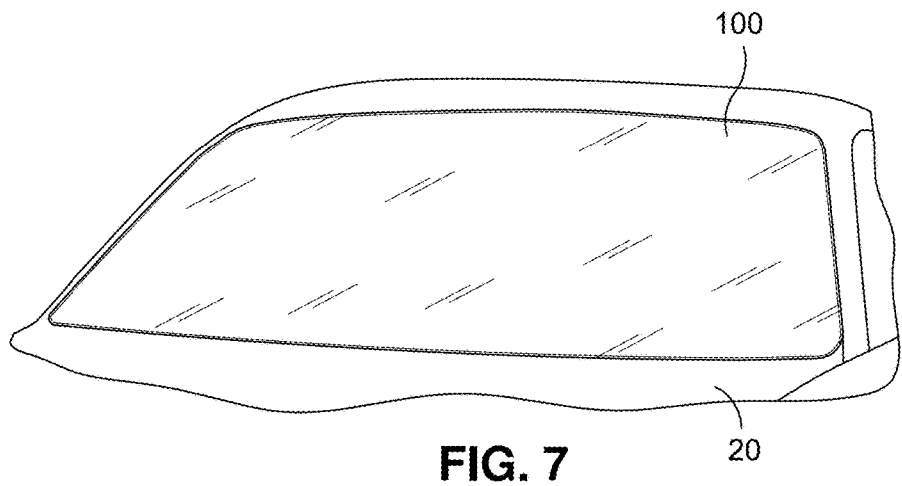
FIG. 7 shows the protective barrier after it has been trimmed to fit the windshield.

FIG. 7 shows the protective barrier 100 including the stack of lenses 110 after the stack of transparent lenses 110 has been trimmed to fit the windshield 10. The stack of lenses 110 may be trimmed using a knife such as a utility knife or box cutter with a stainless-steel blade (a carbon blade may damage the windshield 10). The resulting trimmed stack of lenses 110 may effectively be invisible as it matches the shape of the windshield 10 beneath (though it may alter the coloring of the windshield as in the case of window tinting).

In addition to improving moldability as described above, the use of multiple thin lenses 110 (e.g. 2-4 mil thick) rather than a single monolithic film may allow for a sufficiently reduced haze to be usable on automobile windshields. In general, haze in a PET film has two components: scattering of incident light at the surface and dispersion of incident light in the bulk material. The latter bulk component increases with the thickness of the PET film, for example, as shown in the table below:

| Thickness | Haze % |
|---|---|
| 2 mil | 0.4 |
| 4 mil | 0.6 |
| 7 mil | 0.8 |
| 10 mil | 1.2 |

However, the effect is not additive when multiple PET films are stacked, with three layers only adding about 0.1-0.2% haze in total. Meanwhile, the surface component of haze is mitigated by the addition of hard coat or adhesive. By structuring the protective barrier 100 as a stack of lenses 110 containing relatively thin PET films 112 rather than a single large PET film, a reduced haze can be achieved even while the protective barrier 100 may be thick enough to resist impact at automobile speeds (e.g. 8 mil or thicker) as described above. In particular, the protective barrier 100 described herein, comprising a stack of two or more lenses 110 each of which includes a PET film 112 with a hard coat 114 and an adhesive layer 116, may achieve an initial (pre-weathering) haze of below 1% (preferably below 0.6%), making it suitable for use on automobile windshields.

Weathering may be defined according to a standard such as the ANSI Z26.1-1996 standard at exposure of one year at around 300 MJ/m$^2$ of ultraviolet radiation (e.g. 301 MJ/m$^2$ or 306 MJ/m$^2$ per applicable standards, or 280 MJ/m$^2$ extrapolated from 70 MJ/m$^2$ per three month period). In order to simulate exposure for one year in an outdoor Arizona climate (Arizona being selected as a weathering benchmark for its high temperatures and high-intensity sunlight), a natural sunlight concentrator may be used such as one that complies with the American Society for Testing and Materials (ASTM) G90 standard, entitled "Standard Practice for Performing Accelerated Outdoor Weathering of Materials Using Concentrated Natural Sunlight." The haze and abrasion resistance of the protective barrier 100 may be measured before and at the end of the exposure cycle.

In the comparative example of the RO 4×4 product described above, a UV stabilizer such as a UV absorbing compound is mixed into the hard coat and the adhesive of each of the four layers. After only six months of Arizona exposure, the outermost layer becomes unusable because of loss of transmission, increased haze, and loss of hardness. Because there is so much UV inhibitor in the hard coat, the hard coat has reduced hardness and fractures, allowing the underlying PET core of the outermost layer to become yellow and brittle. The resulting haze may exceed 20%.

In contrast to the RO 4×4 product, the protective barrier 100 described herein may be produced with the PET film 112 of each of the two or more lenses 110 including UV stabilizers such as hydroxyphenyl-benzotriazole or hydroxyphenyl-triazine UV absorbers. The hard coat 114 and/or the adhesive layer 116 of each lens 110 may also include UV stabilizers. Because the UV stabilizers are mixed into the PET film 112, a reduced amount of UV stabilizers can be used in the hard coat 114 and adhesive layer 116, allowing the hard coat 114 to maintain its hardness without sacrificing UV stability. Spreading the UV stabilizers across all components allows for a highly weatherable assembly, such that the protective barrier 100 may exceed one year of ANSI G90 exposure in Arizona sun and may look very good with low haze and little if any yellowing after weathering. The protective barrier 100 may, for example, have an abrasion resistance at 1,000 Taber cycles of less than 1% haze before weathering and less than 4% (preferably less than 2%) haze after weathering.

Although the protective barrier 100 may have sufficient weatherability, eventually the outermost lens 110 (e.g. lens 110c in the 3-layer example of FIG. 1) may become damaged. When the outermost lens 110 becomes unacceptably degraded over time during the life of the vehicle windshield or other window (e.g. due to chips, oxidation, etc.), the outermost lens 110 may simply be peeled off and removed, revealing a fresh lens 110 beneath. To this end, the adhesive layer 116 of the innermost lens 110a (see FIG. 1) may be stronger than the adhesive layers 116 used for the other lenses 110 (and in some cases the adhesive layers 116 may have further decreasing strength with each additional lens 110). In this way, the innermost lens 110a may remain adhered to the windshield or other curved substrate 10 while another lens 110 is peeled off. It is contemplated, for example, that the innermost lens 110a may be intended to remain on the curved substrate 10 for the life of the protective barrier 100, with additional lenses 110 being removable as needed. Along the same lines, each such additional lens 110 beyond the first 110a may be provided with a tab or other means for easy peel-away during the life of the protective barrier 100. By allowing for peeling away of the outermost lens 110 of the stack of lenses 110 in this way, the service life of the protective barrier 100 may be extended.

Figure 8:
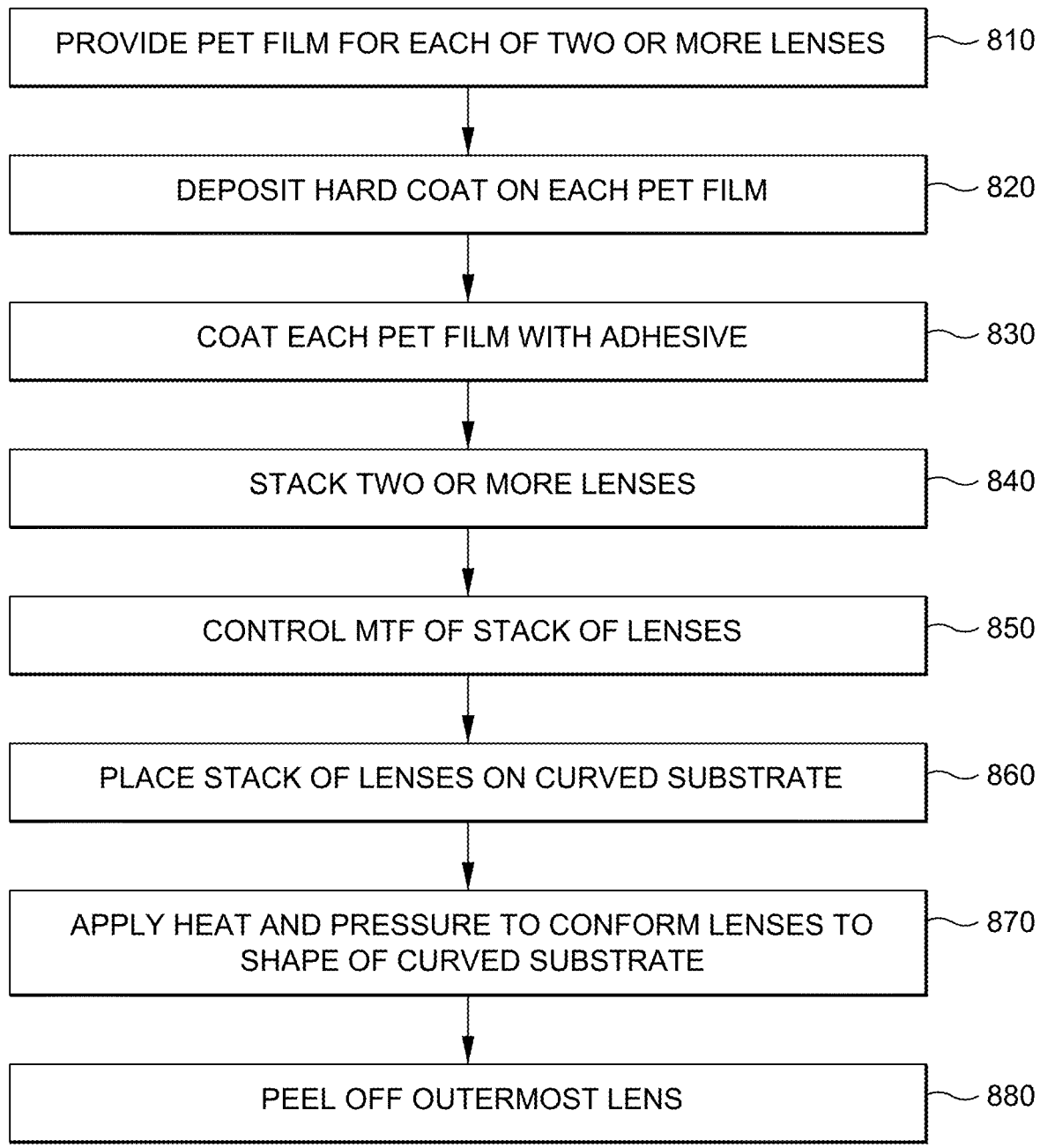
FIG. 8 is an example operational flow according to an embodiment of the present disclosure.

FIG. 8 is an example operational flow according to an embodiment of the present disclosure. The operational flow of FIG. 8 may serve as an example method of manufacturing, installing, and using the protective barrier 100 including the stack of lenses 110 shown in FIG. 1. The operational flow may begin with providing a PET film 112 to be used as the core of each of two or more lenses 110 (step 810). As explained above, the PET film 112 of each of the lenses 110 may be selected for particular MTF data, such as a contrast value greater than 80% for a spatial resolution of one line-pair per 0.0003 radians at 65 degrees angle of incidence and may be, for example, a film sold under the name MELINEX® 454 by DuPont Teijin Films. Alternatively, the PET film 112 of each of the lenses 110 may be fabricated while actively monitoring the MTF data in a continuous or batch-to-batch process as described above. In this regard, providing the PET film 112 may include, for example, melting a resin, extruding the melted resin through a die to produce a polymer film, and cooling the polymer film. A hard coat 114 may be deposited on a first side of the PET film 112 (step 820), which is preferably wet deposited but may be applied according to any appropriate methods including spin coating, dip coating, or vacuum deposition. Before or after the hard coat 114 is applied, the PET film 112 may be coated on the opposite side with an adhesive 116 (step 830). These three elements, the PET film 112, hard coat 114, and adhesive 116 may constitute one of the lenses 110 described herein, which may be stacked to produce the protective barrier 100 (step 840).

During any or all of steps 810-840, the operational flow may comprise controlling the MTF of the stack of lenses 110 (step 850). The MTF of the stack of lenses 110 may be controlled, for example, so as to exhibit a contrast value greater than 75% for a spatial resolution of one line-pair per 0.0003 radians at 65 degrees angle of incidence. As explained above, such control may be achieved by selecting an appropriate pre-fabricated PET film 112 in step 810. Alternatively, or additionally, the control of the MTF may be achieved by actively monitoring and adjusting process parameters (e.g. roller speed of a roll-to-roll process, etc.) while fabricating a PET film 112 in step 810, depositing the hard coat 114 in step 820, applying the adhesive layer 116 in step 830, and/or stacking the two or more lenses 110 in step 840. It is contemplated that such active monitoring and adjusting of process parameters may include a continuous process including a feedback loop of monitored MTF data and/or a batch-to-batch process with MTF measurements manually or automatically fed back from a preceding batch.

Once the protective barrier 100 comprising the stack of lenses 110 has been assembled, the operational flow may continue with installing the protective barrier 100 on a curved substrate 10 such as the windshield of the car 20 shown in FIGS. 5-7. As explained above, the installing may be done while the adhesive layers 116 are only partially cured in order to allow the lenses 110 to "float" on the adhesive and mold to the shape of the substrate 10 individually, rather than as a unitary structure, to avoid creasing. Referring to the operational flow of FIG. 8, the protective barrier 100, including the stack of lenses 110, may be placed on the windshield or other curved substrate 10 (step 860), with the adhesive layer 116 of the lowermost lens 110a (see FIG. 1) in contact with the curved substrate 10. For easier installation, the protective barrier 100 may be rough cut (e.g. using an electric film cutter) so as not to extend too far outside the windshield 10. The operational flow may continue with applying heat and pressure to conform the stack of two or more lenses 110 to the shape of the curved substrate 10 (step 870) as described in relation to FIGS. 5 and 6. In particular, the applying of heat and pressure may be performed at least in part prior to the adhesive layer 116 of each of the two or more lenses 110 being fully cured, for example, prior to the adhesive layer 116 exceeding a peel strength of 25 grams per inch determined as a constant load per unit width needed for peeling. The protective barrier 100 may be completely conformed to the shape of the curved substrate 10 prior to the adhesive layers 116 being fully cured.

After allowing the protective barrier 100 to cool down, the installation may conclude with performing a final trim as described in relation to FIG. 7. The protective barrier 100 including the stack of lenses 110 is now uniformly formed and affixed to the windshield surface. By having the protective barrier 100 installed in this way, rock strike cracking and abrasion damage to the windshield 10 can be reduced while still complying with applicable standards for windshield transmission, abrasion resistance, haze, and distortion for a vehicle operating on land highways.

As explained above, it is contemplated that a protective barrier 100 having more than one lens 110 may allow for the outermost lens 110 to be peeled off and removed to reveal the unused surface of the lens 110 beneath. In this respect, the operational flow of FIG. 8 may continue during the life of the protective barrier 100 that has been installed on a vehicle 20. When the outermost lens 110 becomes unacceptably degraded over time (e.g. after six months, after a year, after scratching from wiper blades begins to occur, etc.), it may be peeled off to reveal the next lens 110 underneath (step 880). The timing of peeling off the outermost lens 110 may depend on the particular climate where the protective barrier 100 is used, with some climates entailing more exposure to sun and others requiring more frequent use of wiper blades, for example.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A protective barrier affixable to a curved substrate, the protective barrier comprising a stack of two or more lenses, each of the two or more lenses including a polyethylene terephthalate (PET) film and a hard coat on a first side of the PET film, the stack of two or more lenses having a modulation transfer function that exhibits a contrast value greater than 90% for a spatial resolution of one line-pair per 0.0003 radians at 45 degrees angle of incidence.

2. The protective barrier of claim 1, wherein each of the two or more lenses further includes an adhesive layer on a second side of the PET film opposite the first side.

3. The protective barrier of claim 2, wherein the adhesive layer of each of the two or more lenses includes UV stabilizers.

4. The protective barrier of claim 1, wherein the modulation transfer function of the stack of two or more lenses exhibits a contrast value greater than 80% for a spatial resolution of one line-pair per 0.0003 radians at 60 degrees angle of incidence.

5. The protective barrier of claim 1, wherein the modulation transfer function of the stack of two or more lenses exhibits a contrast value greater than 85% for a spatial resolution of one line-pair per 0.0003 radians at 55 degrees angle of incidence.

6. The protective barrier of claim 1, wherein the PET film of each of the two or more lenses has a modulation transfer function that exhibits a contrast value greater than 70% for a spatial resolution of one line-pair per 0.0003 radians at 70 degrees angle of incidence.

7. The protective barrier of claim 1, wherein each of the two or more lenses is 2-4 mil thick.

8. The protective barrier of claim 1, wherein the PET film of each of the two or more lenses includes UV stabilizers.

9. The protective barrier of claim 1, wherein the hard coat includes UV stabilizers.

10. The protective barrier of claim 1, wherein the PET film of each of the two or more lenses has a machine direction shrinkage of 0.6%-1.8% and a transverse direction shrinkage of 0.3%-1.1% at 150° C.

11. A method comprising:
stacking two or more lenses, each of the two or more lenses including a polyethylene terephthalate (PET) film and a hard coat on a first side of the PET film, the stack of two or more lenses having a modulation transfer function that exhibits a contrast value greater than 90% for a spatial resolution of one line-pair per 0.0003 radians at 45 degrees angle of incidence;
placing the stack of two more lenses on a curved substrate to contact with the curved substrate; and
applying heat and pressure to conform the stack of two or more lenses to the shape of the curved substrate.

12. The method of claim 11, wherein each of the two or more lenses further includes an adhesive layer on a second side of the PET film opposite the first side.

13. The method of claim 12, wherein the adhesive layer of each of the two or more lenses includes UV stabilizers.

14. The method of claim 12, wherein said applying heat and pressure is performed at least in part prior to the adhesive layer of each of the two or more lenses being fully cured.

15. The method of claim 11, further comprising peeling off an outermost lens of the stack of two or more lenses after said applying heat and pressure.

16. The method of claim 11, wherein the PET film of each of the two or more lenses has a modulation transfer function that exhibits a contrast value greater than 80% for a spatial resolution of one line-pair per 0.0003 radians at 60 degrees angle of incidence.

17. The method of claim 11, wherein each of the two or more lenses is 2-4 mil thick.

18. The method of claim 11, wherein the PET film of each of the two or more lenses includes UV stabilizers.

19. The method of claim 11, wherein the hard coat of each of the two or more lenses includes UV stabilizers.

20. The method of claim 11, wherein the PET film of each of the two or more lenses has a machine direction shrinkage of 0.6%-1.8% and a transverse direction shrinkage of 0.3%-1.1% at 150° C.

* * * * *